United States Patent
Lin et al.

(10) Patent No.: US 12,067,868 B2
(45) Date of Patent: Aug. 20, 2024

(54) SYSTEMS AND METHODS FOR TRAFFIC MONITORING

(71) Applicant: ZHEJIANG DAHUA TECHNOLOGY CO., LTD., Zhejiang (CN)

(72) Inventors: Jun Lin, Hangzhou (CN); Yayun Wang, Hangzhou (CN); Wenbo Chen, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 186 days.

(21) Appl. No.: 17/653,653

(22) Filed: Mar. 6, 2022

(65) Prior Publication Data

US 2022/0189297 A1 Jun. 16, 2022

Related U.S. Application Data

(63) Continuation of application No. PCT/CN2020/114667, filed on Sep. 11, 2020.

(30) Foreign Application Priority Data

Sep. 29, 2019 (CN) .......................... 201910935048.4
Sep. 29, 2019 (CN) .......................... 201910936659.0

(51) Int. Cl.
*G08G 1/017* (2006.01)
*G06T 7/73* (2017.01)
(Continued)

(52) U.S. Cl.
CPC ............. *G08G 1/0175* (2013.01); *G06T 7/73* (2017.01); *G06V 20/54* (2022.01); *G06V 20/625* (2022.01);
(Continued)

(58) Field of Classification Search
CPC ........ G08G 1/0175; G08G 1/056; G06T 7/73; G06T 2207/10012; G06T 2207/30201;
(Continued)

(56) References Cited

U.S. PATENT DOCUMENTS 7,986,339 B2 * 7/2011 Higgins ................. G08G 1/054
348/149
9,547,883 B1 * 1/2017 Stepanenko ............ G06T 15/20
(Continued)

FOREIGN PATENT DOCUMENTS

CN 103366569 A 10/2013
CN 103473926 A 12/2013
(Continued)

OTHER PUBLICATIONS

International Search Report in PCT/CN2020/114667 mailed on Dec. 10, 2020, 4 pages.
(Continued)

*Primary Examiner* — Gims S Philippe
(74) *Attorney, Agent, or Firm* — METIS IP LLC

(57) ABSTRACT

The present disclosure may provide a system. The system may obtain at least one pair of images from at least one pair of capture devices. Each of the at least one pair of capture devices may include a first capture device and a second capture device, and each of the at least one pair of images may include a first image captured by the first capture device and a second image captured by the second capture device. The system may determine first identification information of at least one first object in the first image and determine second identification information of at least one second object in the second image. Further, the system may determine at least one information pair by correlating at least a part of the first identification information and at least a part of the second identification information.

20 Claims, 12 Drawing Sheets

(51) Int. Cl.
*G06V 20/54* (2022.01)
*G06V 20/62* (2022.01)
*G06V 40/10* (2022.01)
*G06V 40/16* (2022.01)
*G08G 1/056* (2006.01)

(52) U.S. Cl.
CPC ......... *G06V 40/103* (2022.01); *G06V 40/172* (2022.01); *G08G 1/056* (2013.01); *G06T 2207/10012* (2013.01); *G06T 2207/30201* (2013.01); *G06T 2207/30232* (2013.01); *G06T 2207/30242* (2013.01); *G06T 2207/30268* (2013.01)

(58) Field of Classification Search
CPC . G06T 2207/30232; G06T 2207/30242; G06T 2207/30268; G06V 20/54; G06V 20/625; G06V 40/103; G06V 40/172; G06V 20/52
See application file for complete search history.

(56) References Cited

U.S. PATENT DOCUMENTS

| | | | | |
|---|---|---|---|---|
| 9,609,197 | B1* | 3/2017 | Stepanenko | H05K 999/99 |
| 2014/0071286 | A1* | 3/2014 | Bernal | G06T 7/223 |
| | | | | 348/149 |
| 2014/0195138 | A1* | 7/2014 | Stelzig | G08G 1/0116 |
| | | | | 701/119 |
| 2017/0289447 | A1* | 10/2017 | Nakao | G06T 3/4038 |
| 2019/0306408 | A1* | 10/2019 | Hofer | H04N 23/90 |
| 2021/0206382 | A1* | 7/2021 | Nakada | B60W 50/14 |

FOREIGN PATENT DOCUMENTS

| | | |
|---|---|---|
| CN | 103927878 A | 7/2014 |
| CN | 104361327 | 2/2015 |
| CN | 104463899 A | 3/2015 |
| CN | 104464290 | 3/2015 |
| CN | 103400157 | 2/2017 |
| CN | 107527012 | 12/2017 |
| CN | 109635645 | 4/2018 |
| CN | 108111749 | 6/2018 |
| CN | 108184686 | 6/2018 |
| CN | 108447091 A | 8/2018 |
| CN | 108492573 | 9/2018 |
| CN | 108694216 | 10/2018 |
| CN | 108765973 A | 11/2018 |
| CN | 109214315 | 1/2019 |
| CN | 109800633 | 5/2019 |
| CN | 110111577 | 6/2019 |
| CN | 110738150 | 1/2020 |
| CN | 110781759 | 2/2020 |

OTHER PUBLICATIONS

Written Opinion in PCT/CN2020/114667 mailed on Dec. 10, 2020, 6 pages.
First Office Action in Chinese Application No. 201910935048.4 mailed on Dec. 9, 2021, 17 pages.
First Office Action in Chinese A pplication No. 201910936659.0 mailed on Nov. 23, 2021, 10 pages.

* cited by examiner

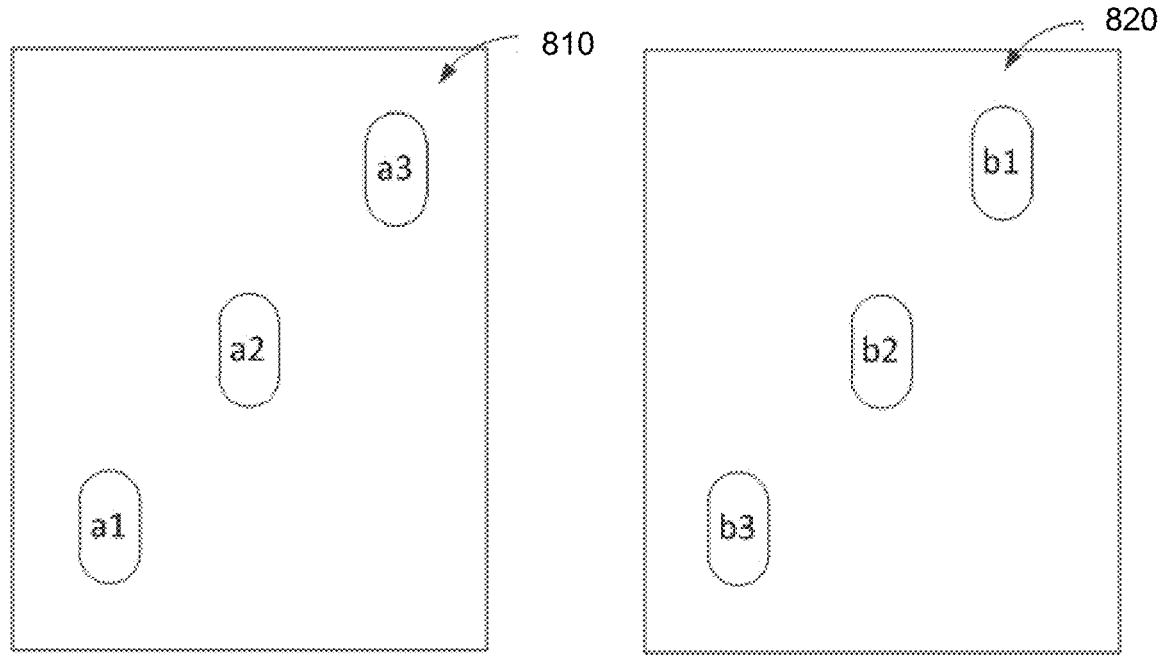
FIG. 8A
FIG. 8B
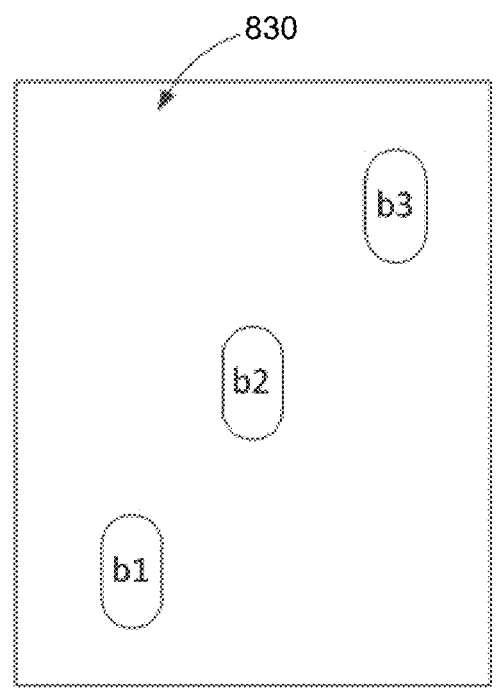
FIG. 8C

SYSTEMS AND METHODS FOR TRAFFIC MONITORING

CROSS-REFERENCE TO RELATED APPLICATIONS

This application is a continuation of International Patent Application No. PCT/CN2020/114667, filed on Sep. 11, 2020, which claims priority to Chinese Patent Application No. 201910935048.4 filed on Sep. 29, 2019 and Chinese Patent Application No. 201910936659.0 filed on Sep. 29, 2019, the entire contents of which are hereby incorporated by reference.

TECHNICAL FIELD

The present disclosure generally relates to traffic monitoring, and in particular, to systems and methods for correlating vehicle information and driver information based on captured images.

BACKGROUND

With the development of image capture and image processing technologies, image-based traffic monitoring becomes more and more important. Commonly, traffic violation behaviors can be detected based on vehicle information (e.g., license plate information) determined based on captured images. However, driver information corresponding to the vehicle information cannot be efficiently obtained. Therefore, it is desirable to provide systems and methods for correlating vehicle information with driver information based on captured images, thereby improving the efficiency and accuracy of the traffic monitoring.

SUMMARY

In one aspect of the present disclosure, a method for correlating vehicle information and driver information may be provided. The method may include: obtaining at least two face images and at least two vehicle images captured from at least two monitoring regions corresponding to at least two correlated capture devices, each of the at least two correlated capture devices comprising a first capture device and a second capture device correlated with each other and respectively configured to capture a face image of the at least two face images and a vehicle image of the at least two vehicle images; for each of the at least two correlated capture devices, determining face information by identifying the face image; determining vehicle information by identifying the vehicle image; and determining a candidate information-matching pair by correlating the face information and the vehicle information; and determining a target information-matching pair by performing similarity matching among different candidate information-matching pairs corresponding to the at least two correlated capture devices.

In some embodiments, for each of the at least two correlated capture devices, the first capture device and the second capture device may be arranged at intervals and correspond to an interval region between the first capture device and the second capture device. The monitoring region corresponding to the first capture device and the monitoring region corresponding to the second capture device may be located in the interval region, so as to allow the first capture device and the second capture device to capture from a front side and a rear side of a vehicle located in the monitoring region to obtain the face image and the vehicle image.

In some embodiments, before the determining the face information by identifying the face image and the determining the vehicle information by identifying the vehicle image for each of the at least two correlated capture devices, the method may also include: obtaining a capture instruction, generated by one of the first capture device and the second capture device, for performing target monitoring on the monitoring region; and transmitting the capture instruction to another one of the first capture device and the second capture device to allow the first capture device and the second capture device to synchronously capture from the monitoring region.

In some embodiments, before the determining the face information by identifying the face image and the determining the vehicle information by identifying the vehicle image for each of the at least two correlated capture devices, the method may also include: obtaining a serial number of a correlated alarm from the one of the first capture device and the second capture device; and transmitting the serial number of the correlated alarm to the another one of the first capture device and the second capture device; and the determining the face information by identifying the face image and the determining the vehicle information by identifying the vehicle image for each of the at least two correlated capture devices may include: obtaining the face image and the vehicle image associated with the serial number of the correlated alarm from the first capture device and the second capture device, respectively; and correlating the face image and the vehicle image according to the serial number of the correlated alarm.

In some embodiments, the correlating the face information and the vehicle information for each of the at least two correlated capture devices may include: rotating one of the vehicle image and the face image by 180 degrees; performing position matching on the face information and the vehicle information based on position information of the face image and the vehicle image determined after the rotation; and correlating at least a part of the face information with at least a part of the vehicle information with a position difference smaller than a preset position threshold.

In some embodiments, the determining the target information-matching pair by performing the similarity matching among the candidate information-matching pairs may include: determining vehicle-matching information with a vehicle similarity greater than a first similarity threshold by performing similarity matching on vehicle information in the different candidate information-matching pairs; determining face-matching information with a face similarity greater than a second similarity threshold by performing similarity matching on face information associated with the vehicle-matching information, and designating the vehicle-matching information and the face-matching information as the target information-matching pair.

In some embodiments, the method may further include: if the target information-matching pair fails to be determined by performing the similarity matching among the different candidate information-matching pairs corresponding to the at least two correlated capture devices, determining the target information-matching pair by performing similarity matching among the candidate information-matching pairs and historical information-matching pairs stored in a face information database.

According to another aspect of the present disclosure, a device for correlating vehicle information and driver information may be provided. The device may include an obtainment module configured to obtain at least two face images and at least two vehicle images captured from at least two monitoring regions corresponding to at least two correlated capture devices, each of the at least two correlated capture devices comprising a first capture device and a second capture device correlated with each other and respectively configured to capture a face image of the at least two face images and a vehicle image of the at least two vehicle images; for each of the at least two correlated capture devices, an identification module configured to determine face information by identifying the face image and determine vehicle information by identifying the vehicle image; a correlation module configured to determine a candidate information-matching pair by correlating the face information and the vehicle information; and a matching module configured to determine a target information-matching pair by performing similarity matching among different candidate information-matching pairs corresponding to the at least two correlated capture devices.

According to another aspect of the present disclosure, a device for correlating vehicle information and driver information may be provided. The device may include at least one processor and at least one storage storing program codes. When the codes are executed by the at least one processor, the program codes may direct the at least one processor to perform a method for correlating vehicle information and driver information. The method may include: obtaining at least two face images and at least two vehicle images captured from at least two monitoring regions corresponding to at least two correlated capture devices, each of the at least two correlated capture devices comprising a first capture device and a second capture device correlated with each other and respectively configured to capture a face image of the at least two face images and a vehicle image of the at least two vehicle images; for each of the at least two correlated capture devices, determining face information by identifying the face image; determining vehicle information by identifying the vehicle image; and determining a candidate information-matching pair by correlating the face information and the vehicle information; and determining a target information-matching pair by performing similarity matching among different candidate information-matching pairs corresponding to the at least two correlated capture devices.

According to another aspect of the present disclosure, a computer readable storage medium may be provided. When the computer readable storage medium is executed by at least one processor, a method for correlating vehicle information and driver information may be performed. The method may include: obtaining at least two face images and at least two vehicle images captured from at least two monitoring regions corresponding to at least two correlated capture devices, each of the at least two correlated capture devices comprising a first capture device and a second capture device correlated with each other and respectively configured to capture a face image of the at least two face images and a vehicle image of the at least two vehicle images; for each of the at least two correlated capture devices, determining face information by identifying the face image; determining vehicle information by identifying the vehicle image; and determining a candidate information-matching pair by correlating the face information and the vehicle information; and determining a target information-matching pair by performing similarity matching among different candidate information-matching pairs corresponding to the at least two correlated capture devices.

According to another aspect of the present disclosure, a method for capturing images by correlated cameras may be provided. The method may include: obtaining at least two images captured from a monitoring region by at least two capture devices, the at least two capture devices corresponding to different capture angles; matching at least one same target in the at least two images by mapping the at least two images into a same coordinate system; and identifying the at least one target based on the at least two images in the same coordinate system.

In some embodiments, the obtaining the at least two images captured from the monitoring region by the at least two capture devices may include: obtaining a first image captured from the monitoring region by a first capture device of the at least two capture devices; determining whether a violation target exists based on the first image; and if the violation target exists, obtaining a second image captured from the monitoring region by a second capture device of the at least two capture devices; and the identifying the at least one target based on the at least two images in the same coordinate system may include: identifying a license plate of the violation target in the second image.

In some embodiments, the obtaining the second image captured from the monitoring region by the second capture device of the at least two capture devices may include: obtaining a capture instruction, generated by the first capture device, for monitoring the violation target in the monitoring region; and obtaining, based on the capture instruction, the second image generated by the second capture device for capturing the violation target in the monitoring region.

In some embodiments, the mapping the at least two images into the same coordinate system may include: identifying a preset count of markers in the at least two images; and mapping the at least two images into the same coordinate system based on a calibration algorithm and the markers.

In some embodiments, the first capture device and the second capture device of the at least two capture devices may be arranged at intervals and correspond to an interval region between the first capture device and the second capture device; and the monitoring region of the first capture device and the monitoring region of the second capture device may be located in the interval region, so as to allow the first capture device and the second capture device to capture from a front side and a rear side of a vehicle located in the monitoring region to obtain the first image and the second image.

In some embodiments, the identifying the at least one target based on the at least two images in the same coordinate system may include: setting tracking information of the at least one target in the at least two images; and performing secondary identification on the at least one target based on the tracking information and images captured by the at least two capture devices sequentially.

In some embodiments, after the performing the secondary identification on the at least one target based on the tracking information and the at least two images captured by the at least two capture devices sequentially, the method may also include: caching and outputting secondary identification information of the at least one target, the secondary identification information comprising vehicle type information of the at least one target, clothing information of the at least one target, or accessory information of the at least one target.

In some embodiments, the performing the secondary identification on the at least one target based on the tracking information and the at least two images captured by the at least two capture devices sequentially may further include: obtaining images captured by the at least two capture devices sequentially based on the tracking information; and estimating feature values of the images using a feature optimization algorithm; and selecting, from the images, at least one image with at least one feature value satisfying a preset condition for the secondary identification.

According to another aspect of the present disclosure, a device for capturing images by correlated cameras may be provided. The device may include at least one processor and at least one storage storing program codes. When the program codes are executed by the at least one processor, the program codes may direct the at least one processor to perform a method for capturing images by correlated cameras. The method may include: obtaining at least two images captured from a monitoring region by at least two capture devices, the at least two capture devices corresponding to different capture angles; matching at least one same target in the at least two images by mapping the at least two images into a same coordinate system; and identifying the at least one target based on the at least two images in the same coordinate system.

According to another aspect of the present disclosure, a computer readable storage medium may be provided. When the computer readable storage medium is executed by at least one processor, a method for capturing images by correlated cameras may be provided. The method may include: obtaining at least two images captured from a monitoring region by at least two capture devices, the at least two capture devices corresponding to different capture angles; matching at least one same target in the at least two images by mapping the at least two images into a same coordinate system; and identifying the at least one target based on the at least two images in the same coordinate system.

According to another aspect of the present disclosure, a system may be provided. The system may include at least one storage device including a set of instructions and at least one processor in communication with the at least one storage device. When executing the set of instructions, the at least one processor may be configured to cause the system to: obtain at least one pair of images from at least one pair of capture devices, wherein each of the at least one pair of capture devices includes a first capture device and a second capture device, one or more of the at least one pair of images correspond to a respective one of the at least one pair of capture devices, and each of the at least one pair of images includes a first image captured by a corresponding first capture device and a second image captured by a corresponding second capture device, a first capture angle of the first capture device being different from a second capture angle of the second capture device; and for each of the at least one pair of images, determine first identification information of at least one first object in the first image; determine second identification information of at least one second object in the second image; and determine at least one information pair by correlating at least a part of the first identification information and at least a part of the second identification information.

In some embodiments, an angle difference between the first capture angle and the second capture angle may be 180 degrees.

In some embodiments, wherein to determine the first identification information of the at least one first object in the first image and to determine the second identification information of the at least one second object in the second image, the at least one processor may be configured to cause the system to: determine a first processed image and a second processed image by performing a coordinate transformation on the first image and the second image; determine the first identification information of the at least one first object based on the first processed image; and determine the second identification information of the at least one second object based on the second processed image.

In some embodiments, wherein to perform the coordinate transformation on the first image and the second image, the at least one processor may be configured to cause the system to: rotate one of the first image or the second image by 180 degrees.

In some embodiments, wherein to perform the coordinate transformation on the first image and the second image, the at least one processor may be configured to cause the system to: determine position information of one or more markers in the first image and the second image, respectively; and perform the coordinate transformation based on the position information of the one or more markers using a calibration algorithm.

In some embodiments, the at least one first object or the at least one second object may include at least one of a vehicle, a driver of the vehicle, one or more passengers in the vehicle, a pedestrian, or a traffic sign.

In some embodiments, the first identification information may include face information associated with a driver of a vehicle, a posture of the driver, face information associated with a passenger in the vehicle, and/or a count of passengers in the vehicle. The second identification information may include vehicle information associated with a vehicle, the vehicle information comprising license plate information and/or a color of the vehicle.

In some embodiments, the at least one processor may be configured to cause the system further to: generate a first matching result by performing similarity matching on a plurality of information pairs corresponding to the at least one pair of images based on the first identification information; or generate a second matching result by performing similarity matching on the plurality of information pairs based on the second identification information; and determine at least one target information pair based on the first matching result or the second matching result.

In some embodiments, wherein to determine at least one information pair by correlating at least a part of the first identification information and at least a part of the second identification information, the at least one processor may be configured to cause the system to: determine whether one or more of the at least one first object or the at least one second object have a violation behavior based on the first identification information or the second identification information; in response to determining that one or more of the at least one first object or the at least one second object have a violation behavior, determine the at least one information pair by correlating a part of the first identification information associated with objects having the violation behavior and a part of the second identification information associated with the objects having violation behavior.

In some embodiments, the at least one processor may be configured to cause the system further to: determine secondary identification information by performing secondary identification on the objects having the violation behavior.

In some embodiments, the violation behavior may include at least one of an overloading behavior, a behavior of not wearing a helmet, a behavior of running a red light, a retrograding behavior, or an illegal road occupation.

According to another aspect of the present disclosure, a capture system may be provided. The capture system may include at least one storage device including a set of instructions and at least one processor in communication with the at least one storage device. When executing the set of instructions, the at least one processor may be configured to cause the system to: obtain at least one primary image captured by at least one primary capture device; determine whether a violation target exists based on the at least one primary image; in response to determining that the violation target exists, obtain at least one secondary image captured by at least one secondary capture device; and identify identification information associated with the violation target based on the at least one secondary image.

According to another aspect of the present disclosure, a method may be provided. The method may be implemented on a computing device including at least one processor, at least one storage medium, and a communication platform connected to a network. The method may include: obtaining at least one pair of images from at least one pair of capture devices, wherein each of the at least one pair of capture devices includes a first capture device and a second capture device, one or more of the at least one pair of images correspond to a respective one of the at least one pair of capture devices, and each of the at least one pair of images includes a first image captured by a corresponding first capture device and a second image captured by a corresponding second capture device, a first capture angle of the first capture device being different from a second capture angle of the second capture device; and for each of the at least one pair of images, determining first identification information of at least one first object in the first image; determining second identification information of at least one second object in the second image; and determining at least one information pair by correlating at least a part of the first identification information and at least a part of the second identification information.

In some embodiments, an angle difference between the first capture angle and the second capture angle may be 180 degrees.

In some embodiments, the determining the first identification information of the at least one first object in the first image and the determining the second identification information of the at least one second object in the second image may include: determining a first processed image and a second processed image by performing a coordinate transformation on the first image and the second image; determining the first identification information of the at least one first object based on the first processed image; and determining the second identification information of the at least one second object based on the second processed image.

In some embodiments, the performing the coordinate transformation on the first image and the second image may include: rotating one of the first image or the second image by 180 degrees.

In some embodiments, the performing the coordinate transformation on the first image and the second image may include: determining position information of one or more markers in the first image and the second image, respectively; and performing the coordinate transformation based on the position information of the one or more markers using a calibration algorithm.

In some embodiments, the at least one first object or the at least one second object may include at least one of a vehicle, a driver of the vehicle, one or more passengers in the vehicle, a pedestrian, or a traffic sign.

In some embodiments, the first identification information may include face information associated with a driver of a vehicle, a posture of the driver, face information associated with a passenger in the vehicle, and/or a count of passengers in the vehicle. The second identification information may include vehicle information associated with a vehicle, the vehicle information comprising license plate information or a color of the vehicle.

In some embodiments, the method may further include: generating a first matching result by performing similarity matching on a plurality of information pairs corresponding to the at least one pair of images based on the first identification information; or generating a second matching result by performing similarity matching on the plurality of information pairs based on the second identification information; and determining at least one target information pair based on the first matching result or the second matching result.

In some embodiments, the determining at least one information pair by correlating at least a part of the first identification information and at least a part of the second identification information may include: determining whether one or more of the at least one first object or the at least one second object have a violation behavior based on the first identification information or the second identification information; in response to determining that one or more of the at least one first object or the at least one second object has a violation behavior, determining the at least one information pair by correlating a part of the first identification information associated with objects having the violation behavior and a part of the second identification information associated with the objects having violation behavior.

In some embodiments, the method may further include: determining secondary identification information by performing secondary identification on the objects having the violation behavior.

In some embodiments, the violation behavior may include at least one of an overloading behavior, a behavior of not wearing a helmet, a behavior of running a red light, a retrograding behavior, or an illegal road occupation.

According to another aspect of the present disclosure, a method may be provided. The method may be implemented on a computing device including at least one processor, at least one storage medium, and a communication platform connected to a network. The method may include obtaining at least one primary image captured by at least one primary capture device; determining whether a violation target exists based on the at least one primary image; in response to determining that the violation target exists, obtaining at least one secondary image captured by at least one secondary capture device; and identifying identification information associated with the violation target based on the at least one secondary image.

According to another aspect of the present disclosure, a non-transitory computer readable medium may be provided. The non-transitory computer readable medium may include executable instructions that, when executed by at least one processor, direct the at least one processor to perform a method. The method may include: obtaining at least one pair of images from at least one pair of capture devices, wherein each of the at least one pair of capture devices includes a first capture device and a second capture device, one or more of the at least one pair of images correspond to a respective one of the at least one pair of capture devices, and each of the at least one pair of images includes a first image captured by a corresponding first capture device and a second image captured by a corresponding second capture device, a first capture angle of the first capture device being different from a second capture angle of the second capture device; and for each of the at least one pair of images, determining first identification information of at least one first object in the first image; determining second identification information of at least one second object in the second image; and determining at least one information pair by correlating at least a part of the first identification information and at least a part of the second identification information.

According to another aspect of the present disclosure, a non-transitory computer readable medium may be provided. The non-transitory computer readable medium may include executable instructions that, when executed by at least one processor, direct the at least one processor to perform a method. The method may include: obtaining at least one primary image captured by at least one primary capture device; determining whether a violation target exists based on the at least one primary image; in response to determining that the violation target exists, obtaining at least one secondary image captured by at least one secondary capture device; and identifying identification information associated with the violation target based on the at least one secondary image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIGS. 8A-8C are schematic diagrams illustrating an exemplary process for performing a coordinate transformation on a first image and a second image according to some embodiments of the present disclosure;

DETAILED DESCRIPTION

Figure 1:
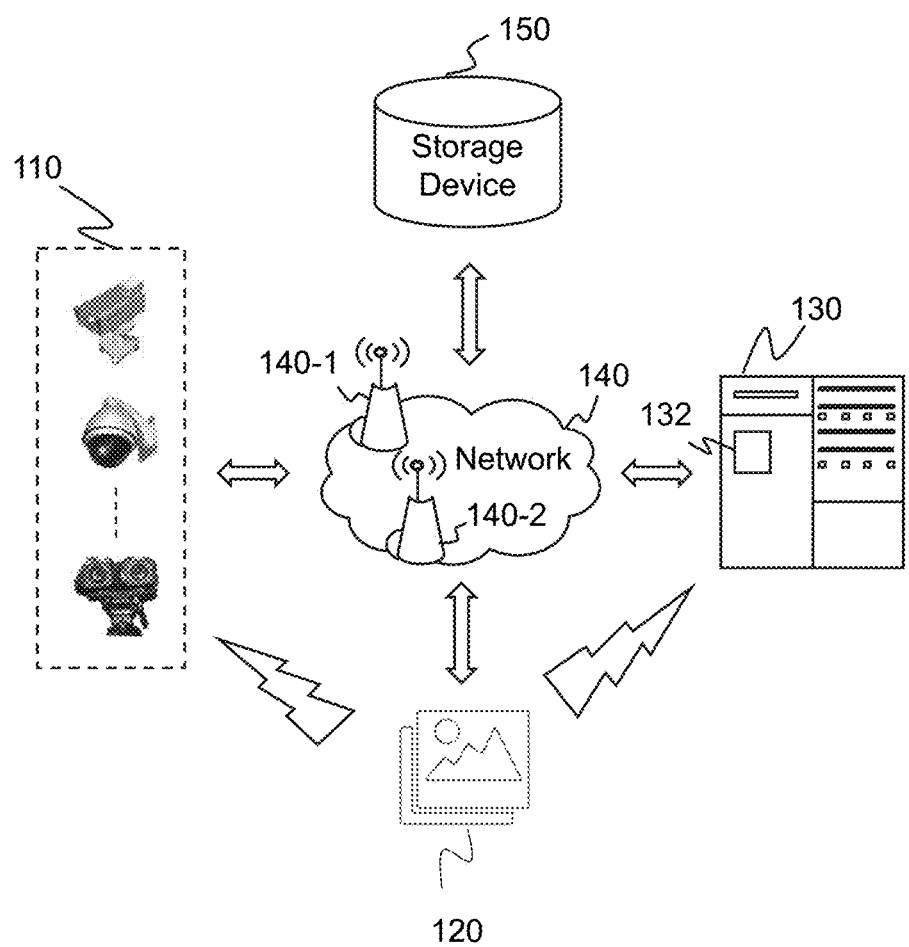
FIG. 1 is a schematic diagram illustrating an exemplary traffic monitoring system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device.

Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for correlating driver information and vehicle information based on at least one pair of images captured by at least one pair of capture devices. In some embodiments, each of the at least one pair of images may include a first image and a second image respectively captured by a first capture device and a second capture device included in one of the at least one pair of capture devices. The first image and the second image may be simultaneously or substantially simultaneously captured from different capture angles. For each of the at least one pair of images, the systems may determine first identification information (e.g., face information associated with a driver) of at least one first object in the first image and second identification information (e.g., vehicle information associated with a vehicle) of at least one second object in the second image. The systems may further determine at least one information pair by correlating at least a part of the first identification and at least a part of the second identification. For example, the systems may determine a face information-vehicle information pair by correlating the face information and the vehicle information. According to the systems and methods of the present disclosure, the face information and the vehicle information can be efficiently and accurately correlated, which can be used for further analysis of violation behaviors, thereby improving the efficiency and accuracy of traffic monitoring.

FIG. 1 is a schematic diagram illustrating an exemplary traffic monitoring system according to some embodiments of the present disclosure. In some embodiments, the traffic monitoring system 100 may include a plurality of capture devices 110 configured to capture images 120, a server 130, a network 140, and a storage device 150. In some embodiments, the traffic monitoring system 100 may perform traffic monitoring based on the images 120. For example, by analyzing and/or processing the images 120, the traffic monitoring system 100 may correlate vehicle information (e.g., license plate information) of vehicles with driver information (e.g., face information) of corresponding drivers and/or passengers of the vehicles. As another example, the traffic monitoring system 100 may also correlate the license plate information and the face information with violation behaviors associated with the drivers and/or passengers.

The capture devices 110 may be configured to capture images associated with objects in a monitoring region. The objects may include a vehicle, a driver of the vehicle, a passenger in the vehicle, a pedestrian, a traffic sign, a road, a marker, a building, a tree, a river, or the like, or any combination thereof. In some embodiments, the capture devices 110 may include a camera, a video recorder, an image sensor, a smartphone, a tablet computer, a laptop computer, a wearable device, or the like, or any combination thereof. The camera may include a gun camera, a dome camera, an integrated camera, a monocular camera, a binocular camera, a multi-view camera, or the like, or any combination thereof. The video recorder may include a PC Digital Video Recorder (DVR), an embedded DVR, or the like, or any combination thereof. The image sensor may include a Charge Coupled Device (CCD), a Complementary Metal Oxide Semiconductor (CMOS), or the like, or any combination thereof. In some embodiments, the capture devices 110 may include at least one pair of capture devices (a pair of capture devices also can be referred to as a "correlated capture device"). Each of the at least one pair of capture devices may include a first capture device (e.g., a capture device A illustrated in FIG. 6A) and a second capture device (e.g., a capture device B illustrated in FIG. 6A).

In some embodiments, the first capture device and the second capture device may be arranged at intervals and correspond to an interval region (e.g., a road section) between the first capture device and the second capture device. Accordingly, a first monitoring region corresponding to the first capture device and a second monitoring region corresponding to the second capture device are located in the interval region, that is, the first monitoring region and the second monitoring region are at least partially overlapped with each (an overlapping region can be designated as a monitoring region of the pair of capture devices). For example, the first capture device and the second capture device may be respectively mounted on two poles along a road section, accordingly, the interval region between the first capture device and the second capture includes the road section and the monitoring region of the pair of capture devices covers at least a portion of the road section.

In some embodiments, the first capture device and the second capture device may be correlated with each other. For example, the first capture and the second capture device may be correlated based on IP addresses. In some embodiments, a correlation identifier (e.g., a serial number, an identifier code) may be assigned to the first capture device and the second capture device. In some embodiments, the first capture device and the second capture device may be configured to capture images from the monitoring region according to different capture angles simultaneously or substantially simultaneously. For example, the first capture device and the second capture device may be set face-to-face, that is, an angle difference between the first capture device and the second capture device is 180 degrees or approximates 180 degrees, such that the first capture device and the second capture device can respectively capture a first image and a second image (also referred to as a "pair of images") from a rear of a vehicle and a front of the vehicle simultaneously or substantially simultaneously. As another example, the first capture device and the second capture device may be set with respective predetermined angles with horizontal direction or vertical direction, for example, the first capture device may be set with 30 degrees with the horizontal direction (e.g., an angle between a first optical axis of the first capture device and the horizontal direction is 30 degrees) and the second capture device may be set with 150 degrees with the horizontal direction (e.g., an angle between a second optical axis of the second capture device and the horizontal direction is 1500 degrees), such that the first capture device and the second capture device can respectively capture a first image and a second image from a rear region of a vehicle and a front region of the vehicle simultaneously or substantially simultaneously.

In some embodiments, in order to ensure that the first capture device and the second capture device capture images simultaneously or substantially simultaneously, when a triggering event is satisfied (e.g., a traffic light in the road section turns red, a target object enters the monitoring region), the server 130 may generate a capture instruction and transmit the capture instruction to the first capture device and the second capture device based on the correlation identifier, such that the first capture device and the second capture device can capture images from the monitoring region substantially simultaneously. Additionally or alternatively, one of the first capture device or the second capture device may generate the capture instruction and transmit it to another one of the first capture device or the second capture device based on the correlation identifier, such that the first capture device and the second capture device can capture images from the monitoring region substantially simultaneously. Additionally or alternatively, one of the first capture device or the second capture device may generate the capture instruction and transmit it to the server 130, then the server 130 may transmit the capture instruction to another one of the first capture device or the second capture device based on the correlation identifier, such that the first capture device and the second capture device can capture images from the monitoring region substantially simultaneously.

In some embodiments, one or more capture lines may be set in the monitoring region. When an object (e.g., a driver) passes across or is located at one of the one or more capture lines, the first capture device and the second capture device may begin to capture images of the object. In some embodiments, the one or more capture lines may be set with a predetermined distance from a boundary of the monitoring region, such that the object can be completely or substantially completely captured.

In some embodiments, the capture devices 110 may automatically capture the images 120 at intervals, for example, every 3 seconds, every 30 seconds, every one minute, every time length corresponding to 150 pixels, etc. The interval may be a default setting of the traffic monitoring system 100 or may be adjustable under different situations.

The server 130 may be a single server or a server group. The server group may be centralized or distributed (e.g., the server 130 may be a distributed system). In some embodiments, the server 130 may be local or remote. For example, the server 130 may access information and/or data stored in the capture devices 110 and/or the storage device 150 via the network 140. As another example, the server 130 may be directly connected to the capture devices 110 and/or the storage device 150 to access stored information and/or data. In some embodiments, the server 130 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 130 may be implemented on a computing device 200 including one or more components illustrated in FIG. 2 of the present disclosure.

In some embodiments, the server 130 may include a processing device 132. The processing device 132 may process information and/or data associated with traffic monitoring to perform one or more functions described in the present disclosure. For example, the processing device 132 may obtain at least one pair of images from the capture devices 110. Each of the at least one pair of images may include a first image and a second image captured by the first capture device and the second capture device respectively. For each pair of the at least one pair of images, the processing device 132 may determine first identification information of the first image and second identification information of the second image. The processing device 132 may also correlate at least a part (e.g., driver information) of the first identification information and at least a part (e.g., vehicle information) of the second identification information. In some embodiments, the processing device 132 may include one or more processing engines (e.g., single-core processing engine(s) or multi-core processor(s)). Merely by way of example, the processing device 132 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the server 130 may be connected to the network 140 to communicate with one or more components (e.g., the capture devices 110, the storage device 150) of the traffic monitoring system 100. In some embodiments, the server 130 may be directly connected to or communicate with one or more components (e.g., the capture devices 110, the storage device 150) of the traffic monitoring system 100.

The network 140 may facilitate exchange of information and/or data. In some embodiments, one or more components (e.g., the capture devices 110, the server 130, the storage device 150) of the traffic monitoring system 100 may transmit information and/or data to other component(s) of the traffic monitoring system 100 via the network 140. For example, the server 130 may obtain at least one pair of images from the capture devices 110 or the storage device 150 via the network 140. In some embodiments, the network 140 may be any type of wired or wireless network, or combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points (e.g., a point 140-1, a point 140-2), through which one or more components of the traffic monitoring system 100 may be connected to the network 140 to exchange data and/or information.

The storage device 150 may store data and/or instructions. In some embodiments, the storage device 150 may store data obtained from the capture devices 110, the server 130, an external storage device, etc. For example, the storage device 150 may store at least one pair of images obtained from the capture devices 110. As another example, the storage device 150 may store correlated first identification information and second identification information determined by the server 130. In some embodiments, the storage device 150 may store data and/or instructions that the server 130 may execute or use to perform exemplary methods described in the present disclosure. For example, the storage device 150 may store instructions that the traffic monitoring system 100 may execute or use to obtain at least one pair of images, each of which may include a first image and a second image captured by the first capture device and the second capture device respectively. As another example, the storage device 150 may store instructions that the traffic monitoring system 100 may execute or use to determine first identification information of the first image and second identification information of the second image, and correlate at least a part (e.g., driver information) of the first identification information and at least a part (e.g., vehicle information) of the second identification information.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components (e.g., the capture devices 110, the server 130) of the traffic monitoring system 100. One or more components of the traffic monitoring system 100 may access the data or instructions stored in the storage device 150 via the network 140. In some embodiments, the storage device 150 may be directly connected to or communicate with one or more components (the capture devices 110, the server 130) of the traffic monitoring system 100. In some embodiments, the storage device 150 may be part of the server 130. For example, the storage device 150 may be integrated into the server 130.

It should be noted that the traffic monitoring system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the capture devices 110 may include at least one group of capture devices, each of which may include more than two (e.g., 3, 4) capture devices (e.g., capture devices 610-1, 610-2, 610-3 illustrated in FIG. 6B). As another example, the traffic monitoring system 100 may also include a user device (not shown) which may be configured to receive information and/or data from the capture devices 110, the server 130, and/or the storage device 150. The user device may provide a user interface via which a user may view information and/or input data and/or instructions to the traffic monitoring system 100.

Figure 2:
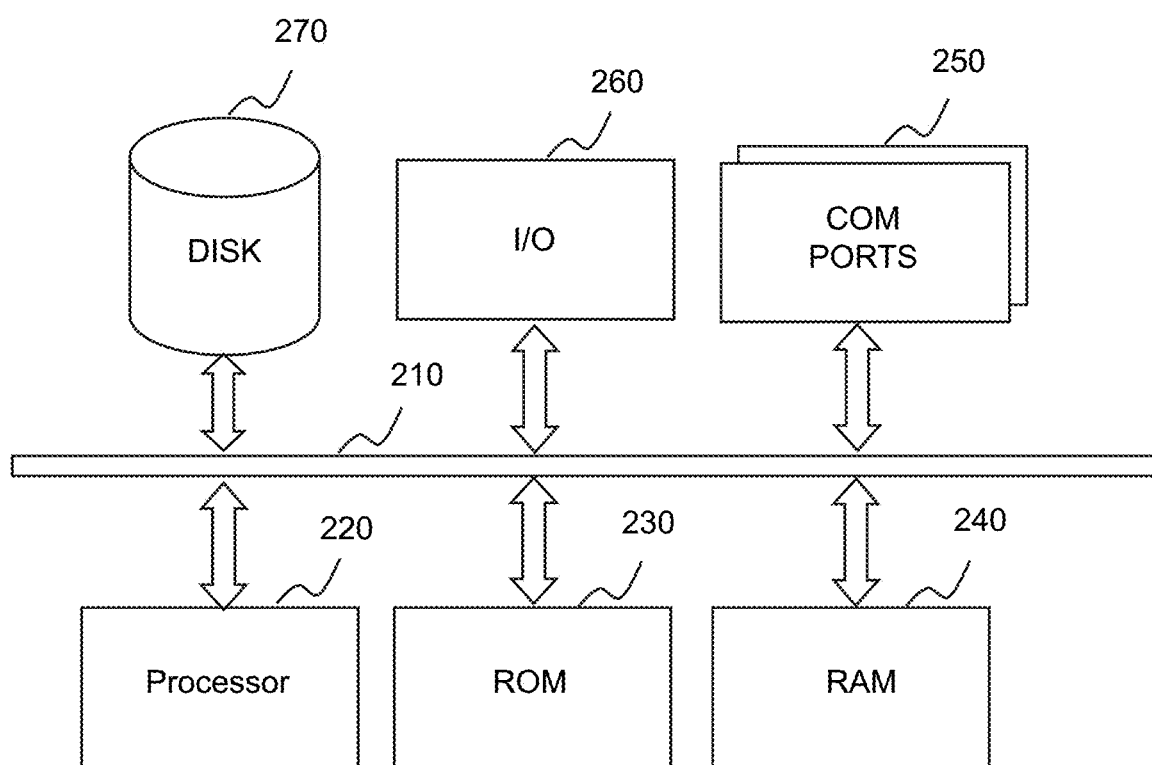
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the traffic monitoring system 100 as described herein. For example, the processing device 132 may be implemented on the computing device 200, via its hardware, software program, firmware, or a combination thereof. Although only one such computer is shown, for convenience, the computer functions relating to traffic monitoring as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., a magnetic storage device, a flash memory, or other non-volatile solid state memories) (not shown), a disk 270, a read-only memory (ROM) 230, or a random-access memory (RAM) 240, or the like, or any combination thereof. In some embodiments, the one or more storages may further include a remote storage corresponding to the processor 220. The remote storage may connect to the computing device 200 via the network 140. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
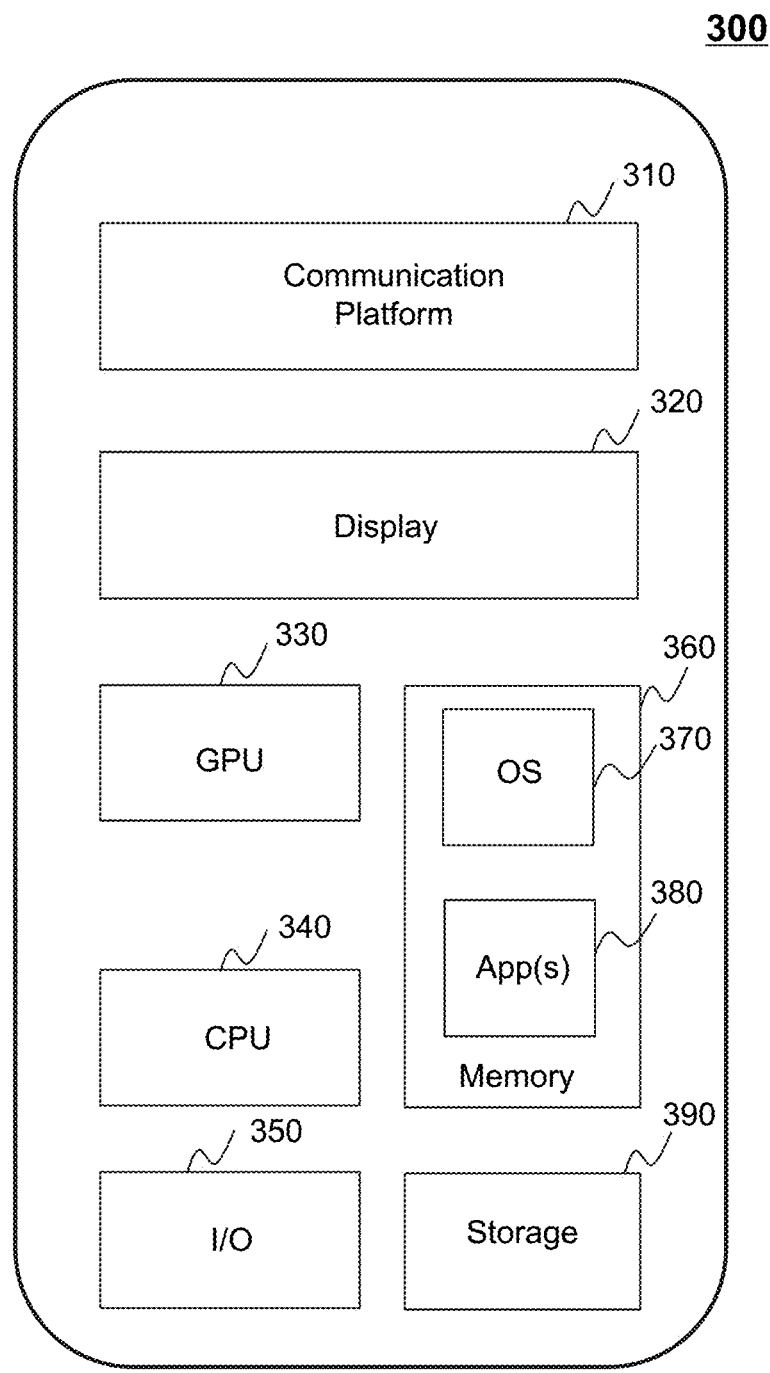
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the server 130 (e.g., the processing device 132) or the user device may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and a storage 390. In some embodiments, any other suitable components, including but not limited to a system bus or a controller (not shown), may also be in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to action recognition or other information from the traffic monitoring system 100. User interactions with the information stream may be achieved via the I/O 350 and provided to the processing device 132 and/or other components of the traffic monitoring system 100 via the network 140.

Figure 4:
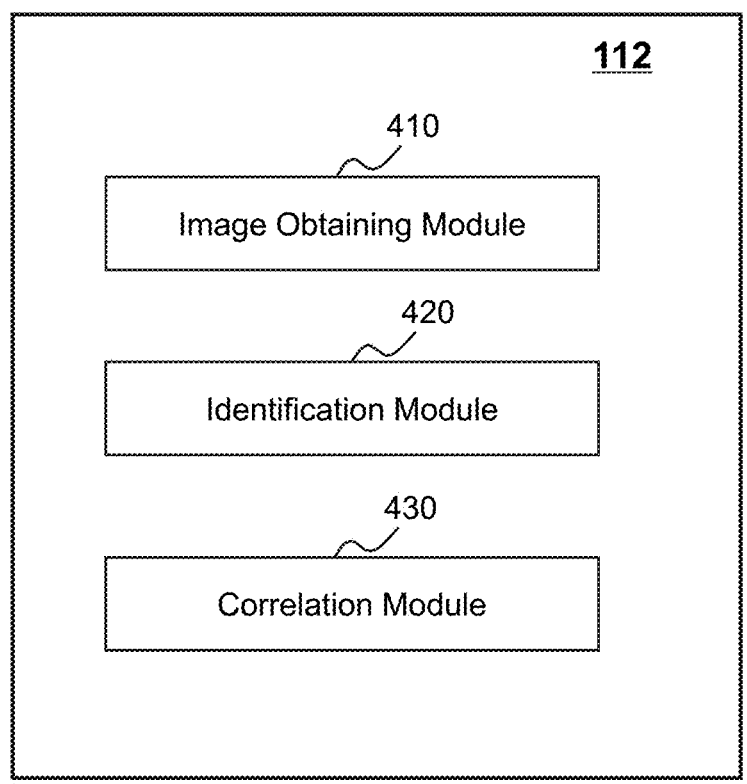
FIG. 4 is a block diagram illustrating an exemplary processing device according to some embodiments of the present disclosure.

FIG. 4 is a block diagram illustrating an exemplary processing device according to some embodiments of the present disclosure. The processing device 132 may include an image obtaining module 410, an identification module 420, and a correlation module 430.

The image obtaining module 410 may be configured to obtain at least one pair of images (e.g., traffic images) from at least one pair of capture devices. In some embodiments, one or more of the at least one pair of images may correspond to a respective one of the at least one pair of capture devices. In some embodiments, as described in connection with FIG. 1, each of the at least one pair of capture devices may include a first capture device and a second capture device. Accordingly, each of the at least one pair of images may include a first image captured by a corresponding first capture device and a second image captured by a corresponding second capture device. In some embodiments, the first image and the second image may be captured simultaneously or substantially simultaneously. In some embodiments, the first image may correspond to a first capture angle and the second image may correspond to a second capture angle, wherein the first capture angle may be different from the second capture angle. More descriptions regarding the at least one pair of capture devices and/or the at least one pair of images may be found elsewhere in the present disclosure (e.g., FIG. 1, FIG. 5, and the descriptions thereof).

For each of the at least one pair of images, the identification module 420 may be configured to determine first identification information of at least one first object in the first image. The first identification information may include face information associated with the driver, face information associated with the passenger, face information associated with the pedestrian, a posture of the driver, a count of the one or more passengers, or the like, or any combination thereof.

The identification module 420 may also be configured to determine second identification information of at least one second object in the second image. The second identification information may include vehicle information associated with the vehicle, for example, license plate information, a color of the vehicle, etc. In some embodiments, the identification module 420 may determine the first identification information and/or the second identification information based on an identification model.

In some embodiments, the identification module 420 may also be configured to process the first image and/or the second image by performing a coordinate transformation. The identification module 420 may process the first image and/or the second image by transforming and/or mapping the first image and the second image into a same coordinate system (e.g., a first coordinate system of the first image, a second coordinate system of the second image, a reference coordinate system other than the first coordinate system and the second coordinate information). More descriptions regarding the coordinate transformation may be found elsewhere in the present disclosure (e.g., FIGS. 7-8C and the descriptions thereof).

For each of the at least one pair of images, the correlation module 430 may be configured to determine at least one information pair (also referred to as "information-matching pair") by correlating at least a part of the first identification information and at least a part of the second identification information. For example, the correlation module 430 may determine the at least one information pair by correlating the face information associated with the driver and the vehicle information associated with the vehicle. As another example, the correlation module 430 may also determine the at least one information pair by correlating the license plate information and the face information with violation behaviors associated with the drivers.

In some embodiments, the processing device 132 may also include a matching module (not shown). The matching module may be configured to generate a first matching result by performing similarity matching on a plurality of information pairs corresponding to the at least one pair of images based on the first identification information. In some embodiments, the matching module may also be configured to generate a second matching result by performing similarity matching on the plurality of information pairs based on the second identification information. Further, the matching module may determine at least one target information pair among the plurality of information pairs based on the first matching result and the second matching result. More descriptions regarding the similarity matching may be found elsewhere in the present disclosure (e.g., FIG. 9 and the descriptions thereof).

In some embodiments, the processing device 132 may also include a secondary identification module (not shown). The secondary identification module may be configured to determine secondary identification information by performing secondary identification on one or more objects (also referred to as one or more "violation targets") having a violation behavior. In some embodiments, the secondary identification information of an object may include vehicle type information (e.g., a bicycle, an electric bicycle, a motorcycle, a car, a bus), clothing information of the object, accessory information (e.g., carrying an umbrella) of the object, or the like, or a combination thereof. The secondary identification module may perform the secondary identification on the one or more violation targets based on tracking information of the one or more violation targets. More descriptions regarding the secondary identification may be found elsewhere in the present disclosure (e.g., FIG. 10 and the descriptions thereof).

The modules in the processing device 132 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the identification module 420 and the secondary identification module may be combined as a single module which may determine the first identification information, the second identification information, and the secondary identification information. As another example, the processing device 132 may include a storage module (not shown) which may be used to store data generated by the above-mentioned modules.

Figure 5:
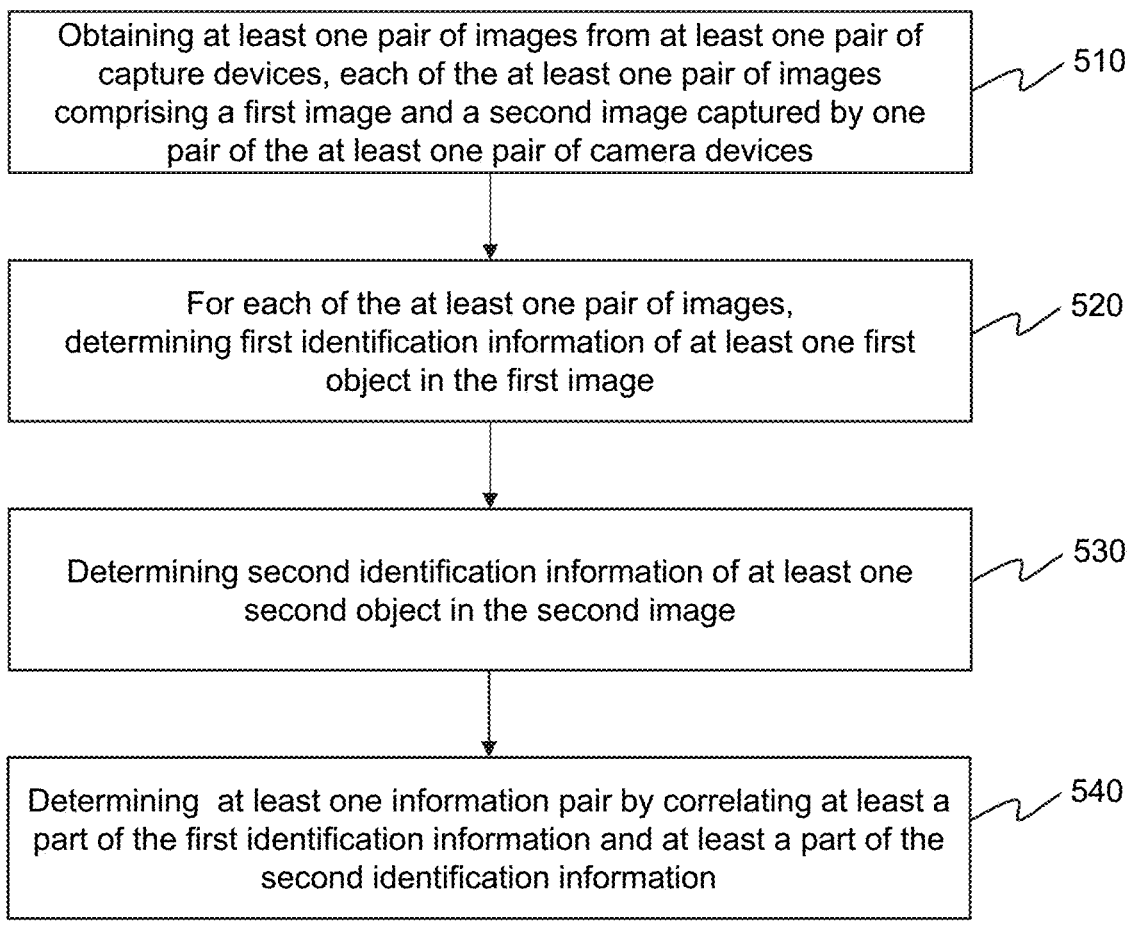
FIG. 5 is a flowchart illustrating an exemplary process for determining at least one information pair by correlating first identification information associated with a first image and second identification information associated with a second image according to some embodiments of the present disclosure.

FIG. 5 is a flowchart illustrating an exemplary process for determining at least one information pair by correlating first identification information associated with a first image and second identification information associated with a second image according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process illustrated in FIG. 5 and described below is not intended to be limiting.

In 510, the processing device 132 (e.g., the image obtaining module 410) (e.g., the interface circuits of the processor 220) may obtain at least one pair of images (e.g., traffic images) from at least one pair of capture devices.

In some embodiments, one or more of the at least one pair of images may correspond to a respective one of the at least one pair of capture devices. Take a specific pair of capture devices as an example, the pair of capture devices may capture one pair of images or multiple pair of images. For example, as described in connection with FIG. 1, multiple capture lines may be set in the monitoring region of the pair of capture devices, accordingly, the pair of capture devices may capture multiple pairs of images corresponding to the multiple capture lines respectively.

In some embodiments, as described in connection with FIG. 1, each of the at least one pair of capture devices may include a first capture device and a second capture device. Accordingly, each of the at least one pair of images may include a first image captured by a corresponding first capture device and a second image captured by a corresponding second capture device. In some embodiments, the first image and the second image may be captured simultaneously or substantially simultaneously. In some embodiments, the first image may correspond to a first capture angle and the second image may correspond to a second capture angle, wherein the first capture angle may be different from the second capture angle. For example, the first capture device and the second capture device may be set face-to-face along a road section, and an angle difference between the first capture angle and the second capture angle may be 180 degrees or may approximate 180 degrees. Accordingly, the first capture device may capture the first image (e.g., a face image of a driver or a passenger) from a front side of an object (e.g., a vehicle) and the second capture device may capture the second image (e.g., a vehicle image) from a rear side of the object. More descriptions regarding the at least one pair of capture devices may be found elsewhere in the present disclosure (e.g., FIG. 1 and the descriptions thereof).

In 520, for each of the at least one pair of images, the processing device 132 (e.g., the identification module 420) (e.g., the processing circuits of the processor 220) may determine first identification information of at least one first object in the first image. As described elsewhere in the present disclosure, the at least one first object may include a vehicle, a driver of the vehicle, one or more passengers in the vehicle, a pedestrian, a traffic sign, or the like, or any combination thereof. The first identification information may include face information associated with the driver, face information associated with the passenger, face information associated with the pedestrian, a posture of the driver, a count of the one or more passengers, or the like, or any combination thereof.

In 530, for each of the at least one pair of images, the processing device 132 (e.g., the identification module 420) (e.g., the processing circuits of the processor 220) may determine second identification information of at least one second object in the second image. As described above, the at least one second object may be totally or partially the same as the at least one first object. The second identification information may include vehicle information associated with the vehicle, for example, license plate information, a color of the vehicle, etc.

In some embodiments, the processing device 132 may determine the first identification information and/or the second identification information based on an identification model. For example, the identification model may include a region with convolutional neural network (R-CNN) model, a fast R-CNN model, a faster R-CNN model, a you only look once (YOLO) model (e.g., YOLOV1, YOLOV2, YOLOV3), a single shot multibox detector (SSD), or the like, or any combination thereof.

In some embodiments, the processing device 132 may also track at least a portion of the at least one first object and/or the at least one second object based on a tracking algorithm. The tracking algorithm may include a kernel correlation filter (KCF), a Kalman filter, a Lucas-Kanade algorithm, a meashift algorithm, a camshift algorithm, or the like, or any combination thereof. Take a specific object as an example, tracking information of the object in an image may include a tracking identity (ID) of the object, position information of the object in the image, a capture time point of the image, or the like, or any combination thereof. In some embodiments, the processing device 132 may instruct the at least one pair of capture devices to capture images associated with a specialized object (e.g., a person, a vehicle) based on the tracking information. For example, the processing device 132 may broadcast a tracking ID of the specialized object to the at least one pair of capture devices to instruct the at least one pair of capture devices to capture images associated with the specialized object.

In some embodiments, as described above, since the first capture angle and the second capture angle may be different, a first coordinate system of the first image and a second coordinate system of the second image may be different, that is, first position information (e.g., a coordinate) of an object in the first coordinate system may be different from second position information (e.g., a coordinate) of the object in the second coordinate system. For example, it is assumed that an angle difference of the first capture device and the second capture device is 180 degrees, an object located at a left upper side of the first image may be located at a right lower side of the second image. In order to process and/or analyze the first image and the second image, the processing device 132 may process the first image and/or the second image by performing a coordinate transformation. The processing device 132 may process the first image and/or the second image by transforming and/or mapping the first image and the second image into a same coordinate system (e.g., the first coordinate system, the second coordinate system, a reference coordinate system). More descriptions regarding the coordinate transformation may be found elsewhere in the present disclosure (e.g., FIGS. 7-8C and the descriptions thereof).

In 540, for each pair of the at least one pair of images, the processing device 132 (e.g., the correlation module 430) (e.g., the processing circuits of the processor 220) may determine at least one information pair (also referred to as "information-matching pair") by correlating at least a part of the first identification information and at least a part of the second identification information. For example, the processing device 132 may determine at least one information pair by correlating the face information associated with the driver and the vehicle information associated with the vehicle, that is, each of the at least one information pair includes face information associated with a driver and vehicle information associated with a vehicle.

In some embodiments, if the second identification information only includes vehicle information of a single vehicle and the first identification information only includes face information associated with a single driver, the processing device 132 may determine an information pair by directly correlating the vehicle information with the face information without performing the coordinate transformation described above.

In some embodiments, if face(s) in the first image do not overlap with other objects in the first image and a distance between each of the face(s) and an object nearest to the face is larger than a first distance threshold, similarly, vehicle(s) in the second image do not overlap with other objects in the second image and a distance between each of the vehicle(s) and an object nearest to the vehicle is larger than a second distance threshold, the processing device 132 may determine at least one information pair by correlating face information associated with a driver located at a first region (e.g., a left upper region) in the first processed image with vehicle information associated with a vehicle located at a second region (which corresponds to the first region) in the second processed image.

In some embodiments, if part of the face(s) in the first image overlaps with other objects in the first image or the distance between part of the face(s) and the object nearest to the face is smaller than or equal to the first distance threshold, similarly, part of vehicle(s) in the second image overlaps with other objects in the second image or the distance between part of the vehicle(s) and the object nearest to the vehicle is smaller than or equal to the second distance threshold, the processing device 132 may determine a first position of a face located in a first region in the first processed image (or the first image) and a second position of a vehicle located in a second region (which corresponds to the first region) in the second processed image (or the second image). Further, the processing device 132 may determine a position difference between the first position and the second position and determine whether the position difference is smaller than a position threshold. In response to determining that the position distance is smaller than the position threshold, the processing device 132 may determine an information pair by correlating face information associated with the face and vehicle information associated with the vehicle. Additionally or alternatively, also take the face and the vehicle described above as an example, the processing device 132 may determine a plurality of position differences corresponding to a plurality of pairs of images (i.e., a plurality of first images and a plurality of corresponding second images). In response to determining that a difference among the plurality of position differences is smaller than a difference threshold, the processing device 132 may determine a plurality of information pairs by correlating the face information associated with the face and the vehicle information associated with the vehicle.

In some embodiments, the above thresholds (e.g., the position threshold, the difference threshold) may be default settings of the traffic monitoring system 100 or may be adjustable under different situations. In some embodiments, the thresholds may relate to one or more factors, for example, a location of an object in an image, a distortion of the object in the image, etc. For example, thresholds corresponding to an object located in the vicinity of the center of the image (i.e., the first image or the second image) may be smaller than that corresponding to an object located in the vicinity of the corner of the image. In some embodiments, the thresholds may be predetermined based on a statistical analysis algorithm or a machine learning algorithm. For example, the processing device 132 may simulate a monitoring region including a plurality of reference objects located at different places. Then the processing device 132 may simulate a plurality of pairs of reference images corresponding to the plurality of reference objects. Further, the processing device 132 may determine the thresholds by processing (e.g., performing a correlation operation) the plurality of pairs of reference images based on the statistical analysis algorithm or the machine learning algorithm.

In some embodiments, as described elsewhere in the present disclosure, each of the at least one pair of images may correspond to a plurality of vehicles and a plurality of drivers (a vehicle and a driver in the vehicle can be collectively referred to as a "vehicle-driver pair"), accordingly, for each of a plurality of vehicle-driver pairs, the processing device 132 may determine at least one information pair. Further, for each of a plurality of vehicle-driver pairs, the processing device 132 may designate one of the at least one information pair as a target information pair. In some embodiments, the processing device 132 may filter out one or more of the at least one information pair based on the first identification information and/or the second identification information and designated one of the remaining pair(s) as the target information pair. More descriptions regarding the information pair may be found elsewhere in the present disclosure (e.g., FIG. 9 and the descriptions thereof).

In some situations, since face information associated with pedestrians in the first image may affect the correlation of the face information associated with the driver with the vehicle information (e.g., the license plate information) associated with the vehicle, the processing device 132 may filter out the face information associated with pedestrians. Since a moving speed of a pedestrian may be smaller than a moving speed of a vehicle, the processing device 132 may identify face(s) of pedestrians based on position information of face(s) in a plurality of first images and filter out the face(s) of pedestrians. For example, if a position difference (which can be considered as an average moving speed) of a face among the plurality of first images is smaller than a threshold, the processing device 132 may determine that the face is a face of a pedestrian.

In some embodiments, the processing device 132 may also determine whether one or more of the at least one first object or the at least one second object have a violation behavior based on the first identification information and/or the second identification information. The violation behavior may include an overloading behavior, a behavior of not wearing a helmet, a behavior of running a red light, a retrograding behavior, an illegal road occupation behavior, etc. In response to determining that one or more of the at least one first object or the at least one second object have a violation behavior, the processing device 132 may determine the at least one information pair by correlating at least a part of the first identification information associated with the violation behavior and at least a part of the second identification information associated with the violation behavior. Further, the processing device 132 may determine secondary identification information by performing secondary identification on the violation behavior. More descriptions regarding the violation behavior and/or the secondary identification may be found elsewhere in the present disclosure (e.g., FIG. 10 and the descriptions thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, if the second identification information indicates that a vehicle does not have a license plate and a driver of the vehicle has a violation behavior (e.g., running a red light), the processing device 132 may correlate the violation behavior with face information associated with the driver in operation 540. As another example, operation 530 may be performed before operation 520 or operation 520 and operation 530 may be performed simultaneously.

Figure 6A:
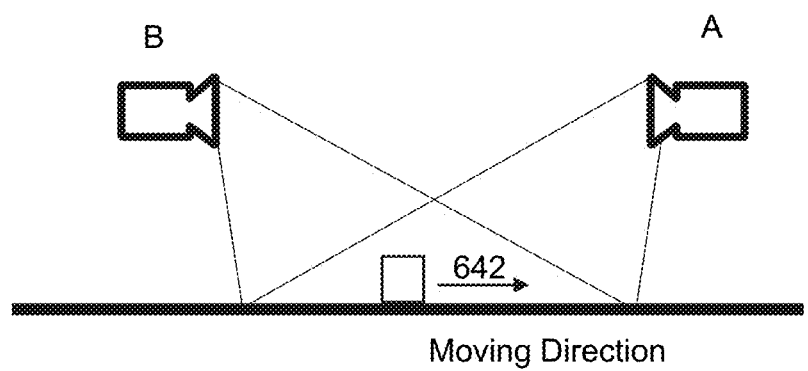
FIG. 6A and FIG. 6B are schematic diagrams illustrating exemplary pairs of capture devices according to some embodiments of the present disclosure.

FIG. 6A is a schematic diagram illustrating an exemplary pair of capture devices according to some embodiments of the present disclosure. As illustrated in FIG. 6A, the pair of capture devices includes a first capture device A and a second capture device B. The first capture device A and the second capture device B are set face-to-face along a road section. When an object (e.g., a vehicle) moves along the road section along a moving direction indicated by an arrow 642, the first capture device A may capture one or more first images from the front side of the object, and the second capture device B may capture one or more second images from the rear side of the object.

Figure 6B:
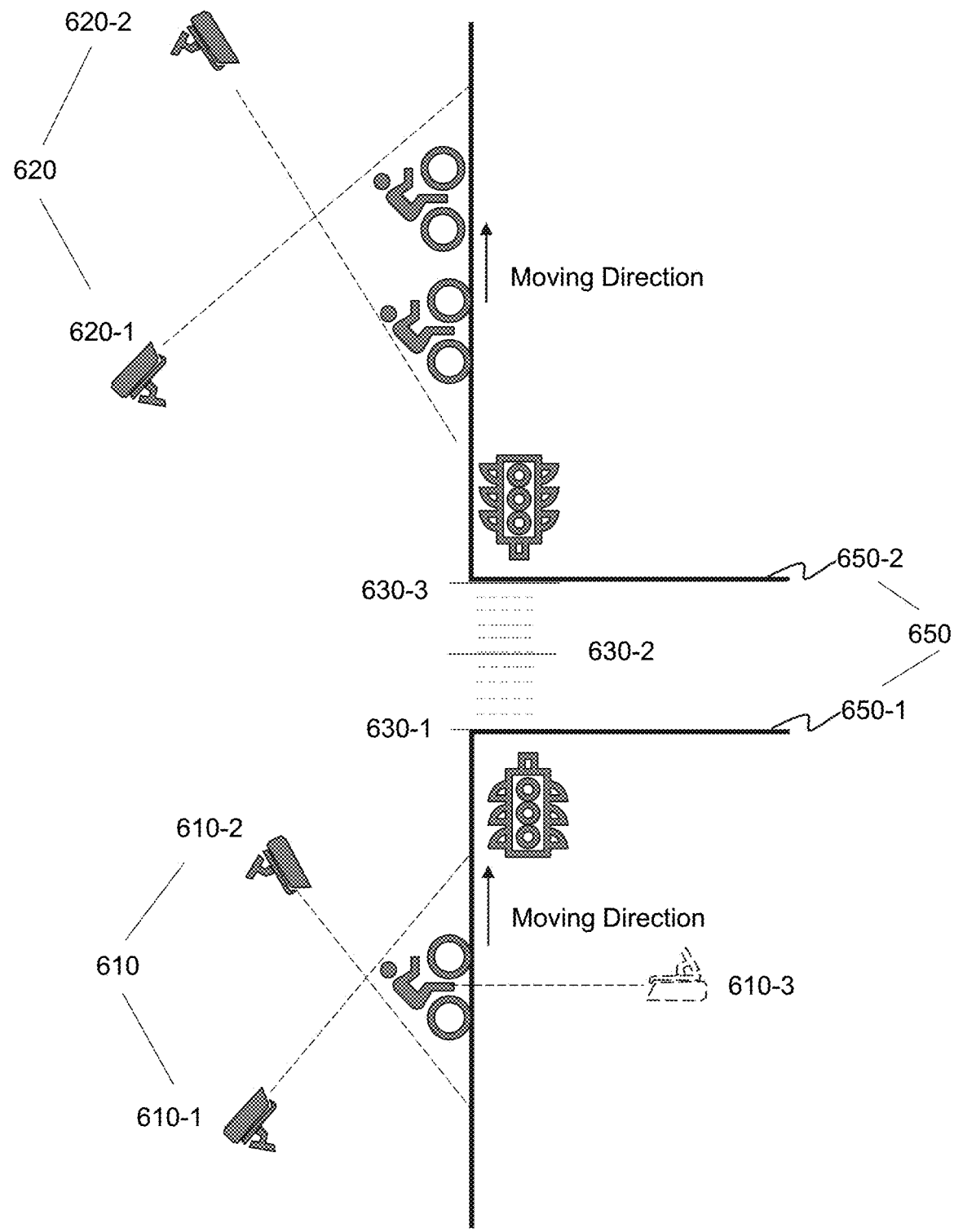

FIG. 6B is a schematic diagram illustrating two exemplary pairs of capture devices according to some embodiments of the present disclosure. As illustrated in FIG. 6B, there may be two pairs of capture devices along a road section, that is, a first pair of capture devices 610 and a second pair of capture devices 620. The first pair of capture devices 610 includes a capture device 610-1 and a capture device 610-2. The second pair of capture devices 620 includes a capture device 620-1 and a capture device 620-2. When a driver drives a vehicle along the road section, the first pair of capture devices 610 and the second capture devices 620 may respectively capture images corresponding to the driver and the vehicle. In some embodiments, a pair of capture devices (e.g., 610) may include more than two capture devices (e.g., 610-1, 610-2, and 610-3), in this situation, the pair of capture devices can be referred to as a "group of capture devices."

Figure 7:
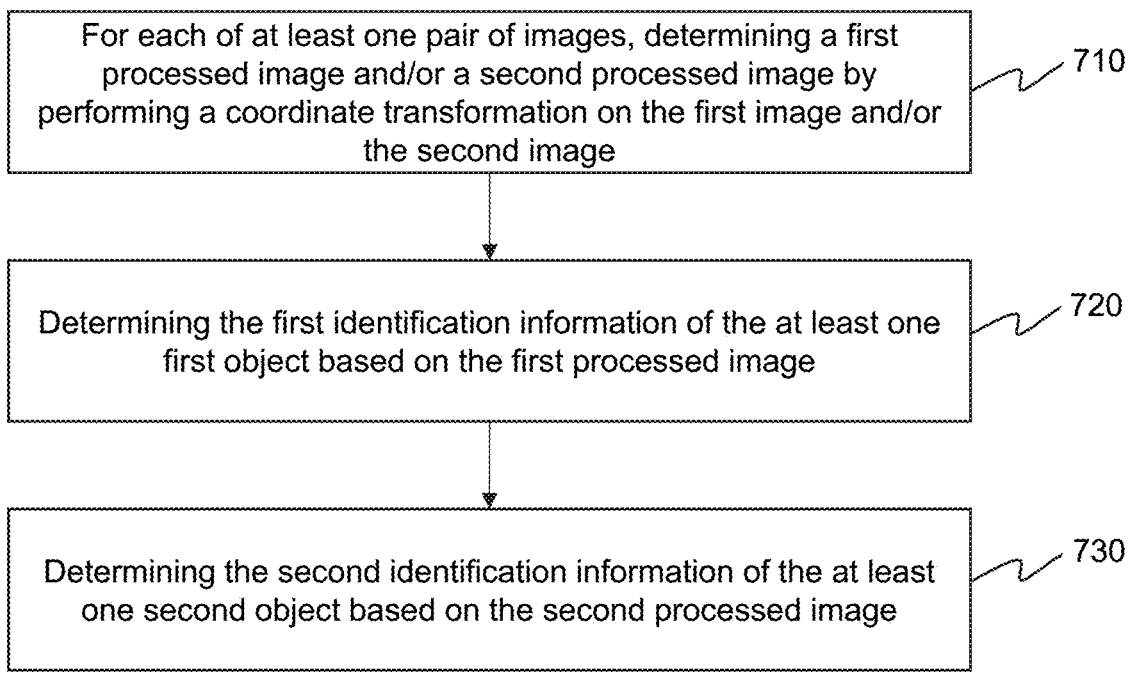
FIG. 7 is a flowchart illustrating an exemplary process for determining first identification information associated with a first image and second identification information associated with a second image according to some embodiments of the present disclosure.

FIG. 7 is a flowchart illustrating an exemplary process for determining first identification information associated with a first image and second identification information associated with a second image according to some embodiments of the present disclosure. In some embodiments, the process 700 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 700. The operations of the illustrated process presented below are intended to be illustrative. In some embodiments, process 700 may be accomplished with one or more additional operations not described and/or without one or more of the operations herein discussed. Additionally, the order in which the operations of the process illustrated in FIG. 7 and described below is not intended to be limiting. In some embodiments, operations 520 and operation 530 may be implemented based on the process 700.

In 710, as described in connection with operation 510, for each of at least one pair of images, the processing device 132 (e.g., the identification module 420) (e.g., the processing circuits of the processor 220) may determine a first processed image and/or a second processed image by performing a coordinate transformation on the first image and/or the second image.

In some embodiments, the processing device 132 may perform the coordinate transformation to map the first image and the second image into a same coordinate system (e.g., a first coordinate system of the first image, a second coordinate system of the second image, a reference coordinate system other than the first coordinate system and the second coordinate system). For example, the processing device 132 may perform the coordinate transformation on the first image to map the first image to the second coordinate system. As another example, the processing device 132 may perform the coordinate transformation on the second image to map the first image to the first coordinate system. As a further example, the processing device 132 may perform the coordinate transformation on both the first image and the second image to map the first image and the second image into the reference coordinate system.

In some embodiments, as illustrated in FIGS. 8A-8C, if the angle difference between the first capture device and the second capture device is 180 degrees, the processing device 132 may determine the first processed image (or the second processed image) by substantially rotating the first image (or the second image) by 180 degrees.

In some embodiments, the processing device 132 may determine position information of one or more markers (e.g., a calibration object, a traffic light pole, a vehicle block pole) in the first image and the second image, respectively. In some embodiments, a count of the one or more markers may be non-limiting, for example, 4, more than 4, etc. Further, the processing device 132 may perform the coordinate transformation based on the position information of the one or more markers using a calibration algorithm. For example, the processing device 132 may determine a first distance between each of the one or more markers and a reference point in the first image and a second distance between each of the one or more markers and a corresponding reference point in the second image. The processing device 132 may transform the first image and the second image into the same coordinate system based on one or more ratios between the one or more first distances and the one or more second distances. In some embodiments, the calibration algorithm may include a Zhang's algorithm, a Tsai's Algorithm, a Selby's algorithm, etc.

In 720, the processing device 132 (e.g., the identification module 420) (e.g., the processing circuits of the processor 220) may determine the first identification information of the at least one first object based on the first processed image. Operation 720 may be similar to operation 520, the description of which is not repeated here.

In 730, the processing device 132 (e.g., the identification module 420) (e.g., the processing circuits of the processor 220) may determine the second identification information of the at least one second object based on the second processed image. Operation 730 may be similar to operation 530, the description of which is not repeated here.

Further, the processing device 132 may determine the at least one information pair by correlating at least a part of the first identification and at least a part of the second identification.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIGS. 8A-8C are schematic diagrams illustrating an exemplary process for performing a coordinate transformation on a first image and a second image according to some embodiments of the present disclosure. As illustrated in FIG. 8A, a first image 810 includes three objects (a1, a2, a3) (e.g., three faces of three drivers in three vehicles). As illustrated in FIG. 8B, a second image 820 includes three objects (b1, b2, b3) (e.g., the three vehicles). In fact, the face a1 corresponds to the vehicle b1, the face a2 corresponds to the vehicle b2, and the face a3 corresponds to the vehicle b3. However, since the first image 810 and the second image 820 are captured according to different capture angles, a first coordinate system of the first image 810 is different from a second coordinate system of the second image 820, that is, a coordinate of an object (e.g., the face a1) in the first image 810 is different from that of a corresponding object (e.g., the vehicle b1) in the second image 820. In order to correlate first identification information (e.g., face information associated with the faces) associated with the objects in the first image 810 and second identification information (e.g., vehicle information associated with the vehicles) associated with the objects in the second image 820, as described in connection with operation 710, the processing device 132 may determine a second processed image 830 by rotating the second image 820 by 180 degrees. It can be seen that the second processed image 830 and the image 810 are in the same coordinate system. Accordingly, the first identification information and the second identification information can be correlated conveniently and accurately.

Figure 9:
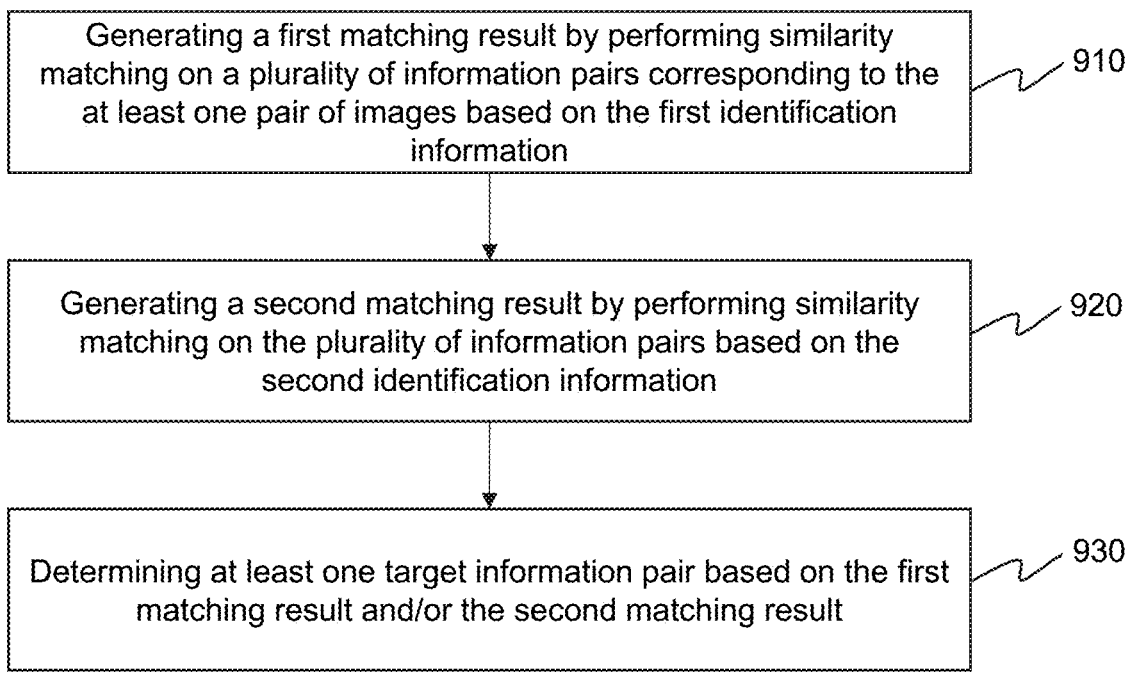
FIG. 9 is a flowchart illustrating an exemplary process for determining at least one target pair of images according to some embodiments of the present disclosure.

FIG. 9 is a flowchart illustrating an exemplary process for determining at least one target information pair according to some embodiments of the present disclosure. In some embodiments, process 900 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 900. The operations of the illustrated process presented below are intended to be illustrative. In some embodiments, process 900 may be accomplished with one or more additional operations not described and/or without one or more of the operations herein discussed. Additionally, the order in which the operations of the process as illustrated in FIG. 9 and described below is not intended to be limiting.

In 910, the processing device 132 (e.g., the matching module) (e.g., the processing circuits of the processor 220) may generate a first matching result by performing similarity matching on a plurality of information pairs (also referred to as "candidate information-matching pairs" or "candidate information pairs") corresponding to the at least one pair of images based on the first identification information.

As described elsewhere in the present disclosure, each of the plurality of candidate information pairs includes part of first identification information (e.g., face information associated with a driver) and part of second identification information (e.g., vehicle information associated with a vehicle). Accordingly, the processing device 132 may perform the similarity matching on the plurality of candidate information pairs based on the first identification information, for example, the face information such as eye information, mouth information, nose information, or the like, or any combination thereof. For example, for any two of the plurality of candidate information pairs, the processing device 132 may determine a similarity (also referred to as a "face similarity") between the two candidate information pairs. The larger the face similarity is, the larger a possibility that faces in the two candidate information pairs correspond to a same driver may be. The processing device 132 may determine a plurality of face similarities, each of which corresponds to two candidate information pairs among the plurality of candidate information pairs. Further, for each of the plurality of face similarities, the processing device 132 may determine whether the face similarity is larger than a first similarity threshold. In response to determining that the face similarity is larger than the first similarity threshold, the processing device 132 may designate two candidate information pairs corresponding to the face similarity as first intermediate information pairs (which can be considered as the first matching result).

In 920, the processing device 132 (e.g., the matching module) (e.g., the processing circuits of the processor 220) may generate a second matching result by performing similarity matching on the plurality of information pairs (or the first intermediate information pairs) based on the second identification information.

As described above, the processing device 132 may perform the similarity matching on the plurality of information pairs based on the second identification information, for example, vehicle information associated with a vehicle (e.g., license plate information, color information). For example, for any two of the plurality of candidate information pairs, the processing device 132 may determine a similarity (also referred to as a "vehicle similarity") between the two candidate information pairs. The larger the vehicle similarity is, the larger a possibility that vehicles in the two candidate information pairs correspond to a same vehicle may be. The processing device 132 may determine a plurality of vehicle similarities, each of which corresponds to two candidate information pairs among the plurality of candidate information pairs. Further, for each of the plurality of vehicle similarities, the processing device 132 may determine whether the vehicle similarity is larger than a second similarity threshold. In response to determining that the vehicle similarity is larger than the second similarity threshold, the processing device 132 may designate two candidate information pairs corresponding to the vehicle similarity as second intermediate information pairs (which can be considered as the second matching result).

In 930, the processing device 132 (e.g., the matching module) (e.g., the processing circuits of the processor 220) may determine at least one target information pair based on the first matching result and/or the second matching result.

In some embodiments, the processing device 132 may designate any one or more pairs of the first intermediate information pairs or the second intermediate information pairs as the at least one target information pair.

In some embodiments, the processing device 132 may firstly determine the first matching result (i.e., firstly obtain the first intermediate information pairs) and secondly determine the second matching result based on the first matching result (i.e., secondly obtain the second intermediate information pairs by performing similarity matching on the first intermediate information pairs). Accordingly, the processing device 132 may designate any one or more pairs of the second intermediate information pairs as the at least one target information pair.

In some embodiments, the processing device 132 may firstly determine the second matching result (i.e., firstly obtain the second intermediate information pairs) and secondly determine the first matching result based on the second matching result (i.e., secondly obtain the first intermediate information pairs by performing similarity matching on the second intermediate information pairs). Accordingly, the processing device 132 may designate any one or more pairs of the first intermediate information pairs as the at least one target information pair.

In some embodiments, the first similarity threshold and/or the second similarity threshold may be adjusted according to practical demands. For example, the first similarity threshold and/or the second similarity threshold may be set as relatively small values, thereby increasing the speed of determining the at least one target information pair.

It should be noted that the above description is merely provided for the purposes of illustration, and not intended to limit the scope of the present disclosure. In some embodiments, as described in connection with operation 540, for each of the at least one pair of images, the processing device 132 may determine the at least one information pair by cross-correlating vehicle information associated with a vehicle with face information associated with a driver. Take a pair of images illustrated in FIGS. 8A-8C as an example, the second image 820 includes three vehicles (b1, b2, b3) and the first image 810 includes three faces (a1, a2, a3) of three drivers. The processing device 132 may generate nine information pairs by cross-correlating first identification information corresponding to the three faces and second identification information corresponding to the three vehicles, which may be denoted as b1-a1, b1-a2, b1-a3, b2-a1, b2-a2, b2-a3, b3-a1, b3-a2, and b3-a3. Further, the processing device 132 may then perform process 900 to determine the at least one target information pair based on a plurality of information pairs corresponding to the at least one pair of images.

In some embodiments, if the at least one target information-matching pair fails to be determined by performing the similarity matching among the plurality of candidate information pairs, the processing device 132 may determine the at least one target information pair by performing similarity matching among the plurality of candidate information pairs and historical information pairs stored in a face information database according to the operations described above. For example, if the at least one pair of images used to determine the plurality of candidate information pairs are captured within a time period, for example, 6 hours, 12 hours, etc., within which the driver of the vehicle may remain the same, information pairs determined based on at least one pair of historical images captured before the time period may be used as historical information pairs to determine the at least one target information pair.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
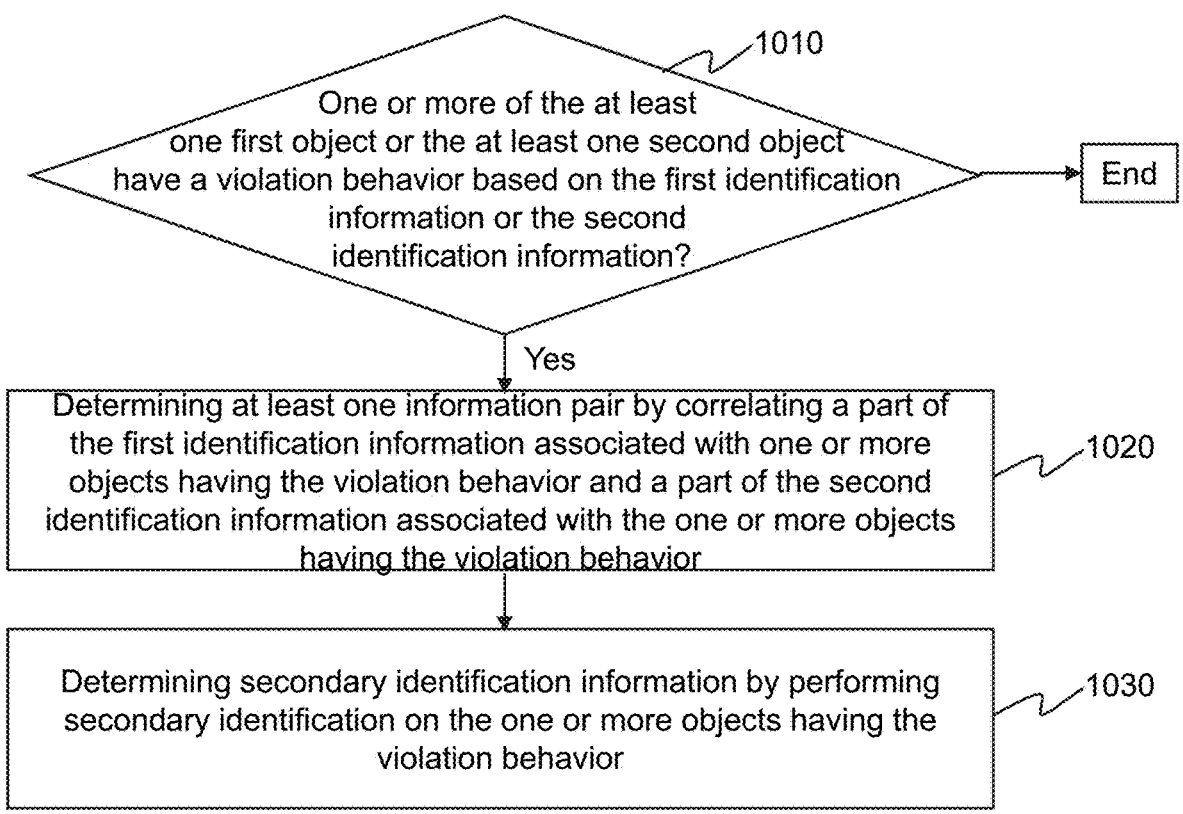
FIG. 10 is a flowchart illustrating an exemplary process for determining secondary identification information of objects having violation behavior according to some embodiments of the present disclosure.

FIG. 10 is a flowchart illustrating an exemplary process for determining secondary identification information of objects having violation behavior according to some embodiments of the present disclosure. In some embodiments, process 1000 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 1000. The operations of the illustrated process presented below are intended to be illustrative. In some embodiments, process 1000 may be accomplished with one or more additional operations not described and/or without one or more of the operations herein discussed. Additionally, the order in which the operations of the process illustrated in FIG. 10 and described below is not intended to be limiting.

In 1010, the processing device 132 (e.g., the correlation module 430) (e.g., the processing circuits of the processor 220) may determine whether one or more of the at least one first object or the at least one second object have a violation behavior based on the first identification information or the second identification information.

In some embodiments, the violation behavior may include an overloading behavior, a behavior of not wearing a helmet, a behavior of running a red light, a retrograding behavior, an illegal road occupation behavior, etc.

In some embodiments, the processing device 132 may determine a count of occupants (e.g., a driver, a passenger) in a vehicle based on the first identification information and identify the overloading behavior based on the count of occupants. For example, for each of the at least one pair of images, which includes a first image and a second image, the processing device 132 may determine a count of faces in a vehicle in the first image as the count of occupants in the vehicle. Further, the processing device 132 may determine whether the count of occupants is larger than a count threshold (e.g., 2, 4). In response to determining that the count of occupants is larger than a count threshold, the processing device 132 may determine that the driver has the overloading behavior. In some embodiments, the processing device 132 may determine at least one candidate count of occupants corresponding to the at least one pair of images and determine the count of occupants by averaging the at least one candidate count. In some embodiments, since in some of the at least one pair of images, an occupant (e.g., a driver, a passenger) may be not shown in the first image (e.g., a face is not identified due to weak light, a face is not identified because it is obscured), the processing device 132 may designate a maximum count of occupants among the at least one candidate count of occupants as the count of occupants. In some embodiments, if a predetermined proportion (e.g., ½, ⅓) of the at least one candidate count of occupants correspond to a same value (e.g., 3), the processing device 132 may designate the same value as count of occupants.

In some embodiments, the processing device 132 may determine whether a driver or a passenger wears a helmet based on the first identification information. For example, for each of the at least one pair of images, which includes a first image and a second image, the processing device 132 may determine whether a covering or a mask partially covers a face in a vehicle in the first image. In response to determining that there is no covering or mask covering the face in the first image, the processing device 132 may determine that the driver or the passenger has the behavior of not wearing a helmet.

In some embodiments, the processing device 132 may identify the retrograding behavior based on the second identification information. For example, for each of the at least one pair of images, which includes a first image and a second image, the processing device 132 may determine whether a heading of a vehicle in the second image points to a prescribed direction. In response to determining that the heading of the vehicle does not point to a prescribed direction, the processing device 132 may determine that the vehicle has the retrograding behavior. In some embodiments, as described in connection with FIG. 5, the processing device 132 may identify the driving direction based on tracking information of the vehicle.

In some embodiments, the processing device 132 may identify the behavior of running a red light based on the first identification information. For example, the processing device 132 may direct the first capture device to capture at least three first images corresponding to three capture lines (e.g., 630-1, 630-2, 630-3 illustrated in FIG. 6B) at a crossing where a traffic light is located and identify the behavior of running a red light based on the at least three first images. As illustrated in FIG. 6B, 650 refers to a road section, 650-1 refers to a first edge of the road section 650, and 650-2 refers to a second edge of the road section 650. Accordingly, the three capture lines (referred to as a first capture line, a second capture line, and a third capture line) may correspond to the first edge, a center line, and the second edge respectively. In some alternative embodiments, the third capture line may not be set in the second edge, but between the center line and the second edge. For example, a distance between the third line and the second edge may be 100 pixels.

In some embodiments, the processing device 132 may identify the illegal road occupation behavior based on the second identification information. For example, for each of the at least one pair of images, which includes a first image and a second image, the processing device 132 may determine a type (e.g., a motor vehicle or a non-motor vehicle) of a vehicle in the second image and determine whether the vehicle is located at a legal place corresponding to the type of the vehicle. Further, the processing device 132 may also determine whether the vehicle is continually moving based on the at least one second image in the at least one pair of images (in this situation, the at least one second image is captured according to a predetermined interval (e.g., 150 pixels) and is normalized to 1024 pixels). In response to determining that the vehicle is not located at a legal place corresponding to the type of the vehicle and is continually moving, for example, if the vehicle is a motor vehicle but is moving along a non-motor lane, the processing device 132 may determine that the vehicle has an illegal road occupation behavior.

In 1020, the processing device 132 (e.g., the correlation module 430) (e.g., the processing circuits of the processor 220) may determine at least one information pair by correlating a part of the first identification information associated with one or more objects (also referred to as "violation target") having the violation behavior and a part of the second identification information associated with the one or more objects having the violation behavior. Operation 1020 may be similar to operation 540, the description of which is not repeated here.

In 1030, the processing device 132 (e.g., the secondary identification module) (e.g., the processing circuits of the processor 220) may determine secondary identification information by performing secondary identification on the one or more objects having the violation behavior. In some embodiments, the secondary identification information of an object may include vehicle type information (e.g., a bicycle, an electric bicycle, a motorcycle, a car, a bus), clothing information of the object, accessory information (e.g., carrying an umbrella) of the object, or the like, or a combination thereof. As used herein, the clothing information of the object includes a color of clothes, a company logo on the clothes, etc. Since deliverymen in different delivery companies may wear clothes with different colors or clothes corresponding to different companies may include different logos, the clothing information may be used to identify the object's company, which may be convenient for the control of vehicles of the different delivery companies.

As described in connection with FIG. 5, the processing device 132 may perform the secondary identification on the one or more violation targets based on the tracking information of the one or more violation targets. In some embodiments, the processing device 132 may broadcast the tracking information to the at least one pair of capture devices to instruct the at least one pair of capture devices to capture images of the one or more violation targets. In some embodiments, the processing device 132 may position the one or more violation targets based on position information included in the tracking information and then determine secondary identification information of the one or more violation targets. In some embodiments, the processing device 132 may also cache and output the secondary identification information into a storage device (e.g., the storage device 150) of the traffic monitoring system 100, an external device, etc.

In some embodiments, the processing device 132 may select at least one optimal image with a relatively high quality (e.g., with a relatively high resolution, reflecting relatively more features associated with the one or more violation targets) from the at least one pair of images and perform the secondary identification based on the at least one optimal image. In some embodiments, the processing device 132 may select the at least one optimal image by estimating feature values of the at least one pair of images based on a feature optimization algorithm. Take a specific image as an example, if the feature value of the image satisfies a condition (e.g., larger than a threshold), the processing device 132 may select the image as an optimal image.

Figure 11:
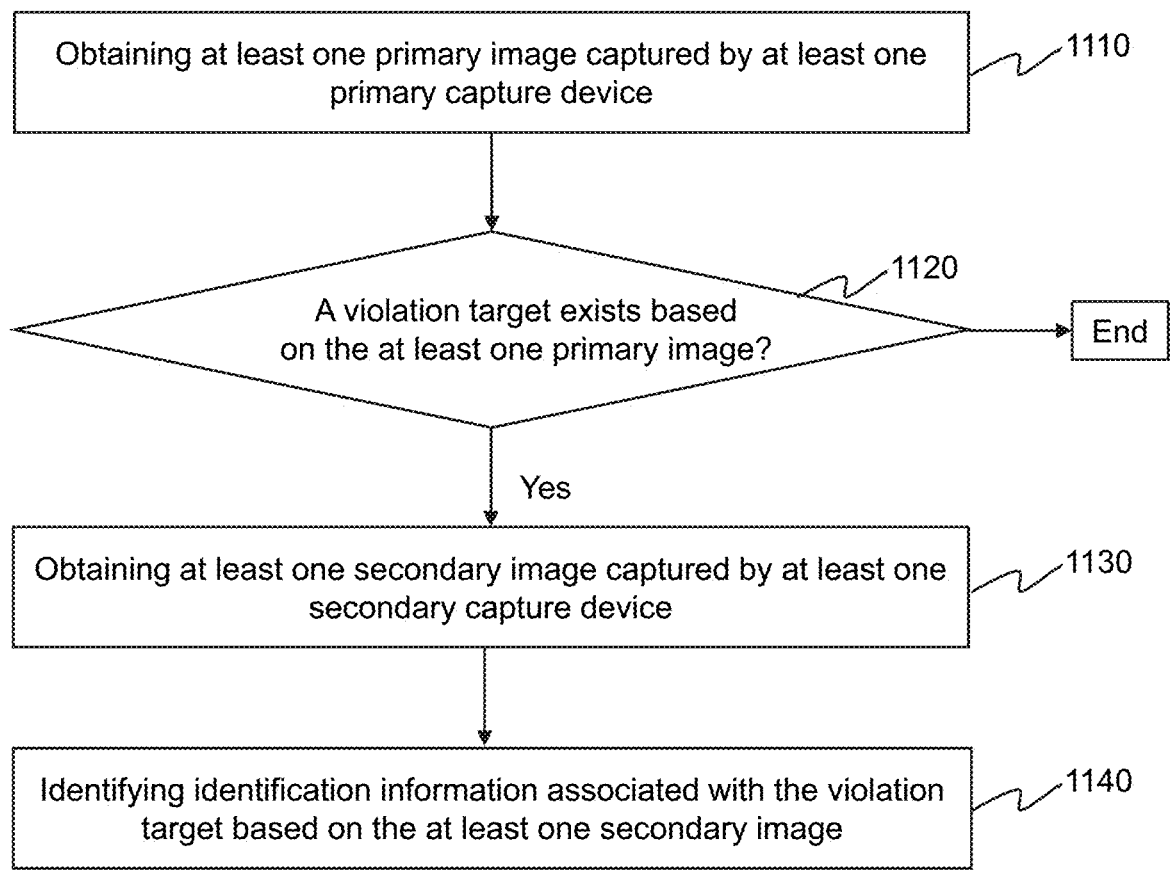
FIG. 11 is a flowchart illustrating an exemplary process for identifying identification information associated with a violation target according to some embodiments of the present disclosure.

FIG. 11 is a flowchart illustrating an exemplary process for identifying identification information associated with a violation target according to some embodiments of the present disclosure. In some embodiments, process 1100 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 1100. The operations of the illustrated process presented below are intended to be illustrative. In some embodiments, process 1100 may be accomplished with one or more additional operations not described and/or without one or more of the operations herein discussed. Additionally, the order in which the operations of the process illustrated in FIG. 11 and described below is not intended to be limiting.

In 1110, the processing device 132 (e.g., the image obtaining module 410) (e.g., the interface circuits of the processor 220) may obtain at least one primary image (e.g., a traffic image) captured by at least one primary capture device. As described elsewhere in the present disclosure, each of the at least one pair of capture devices may include a first capture device and a second capture device. As used herein, the primary capture device may be the first capture device or the second capture device. Accordingly, the first primary image may be a first image captured by the first capture device or a second image captured by the second capture device.

In 1120, the processing device 132 (e.g., the identification module 420) (e.g., the processing circuits of the processor 220) may determine whether a violation target exists based on the at least one primary image. As used herein, the violation target may refer to an object having a violation behavior.

As described in connection with FIG. 10, the violation behavior may include an overloading behavior, a behavior of not wearing a helmet, a behavior of running a red light, a retrograding behavior, an illegal road occupation behavior, etc. In some embodiments, the processing device 132 may determine the violation behavior based on primary identification information (e.g., the first identification information associated with the first image or the second identification information associated with the second image) of the at least one primary image. More descriptions regarding the determination of the violation target may be found elsewhere in the present disclosure (e.g., FIG. 10 and the descriptions thereof).

In 1130, in response to determining that the violation target exists, the processing device 132 (e.g., the image obtaining module 410) (e.g., the interface circuits of the processor 220) may obtain at least one secondary image captured by at least one secondary capture device. As described in connection with operation 1110, if the primary capture device is the first capture device, the secondary capture is the second capture device; if the primary capture device is the second capture device, the secondary capture device is the first capture device.

In 1140, the processing device 132 (e.g., the identification module 420) (e.g., the processing circuits of the processor 220) may identify identification information (also referred to as "secondary identification information") associated with the violation target based on the at least one secondary image. More descriptions may be found in FIG. 10 and the descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a method for correlating vehicle information and driver information. The method may include obtaining at least two face images and at least two vehicle images captured from at least two monitoring regions corresponding to at least two correlated capture devices. Each of the at least two correlated capture devices may include a first capture device and a second capture device correlated with each other and respectively configured to capture a face image of the at least two face images and a vehicle image of the at least two vehicle images. For each of the at least two correlated capture devices, the method may include determining face information by identifying the face image, identifying vehicle information by identifying the vehicle image, and determining a candidate information-matching pair by correlating the face information and the vehicle information. The method may also include determining a target information-matching pair by performing similarity matching among different candidate information-matching pairs corresponding to the at least two correlated capture devices. In some embodiments, the present disclosure may also provide a device for correlating the vehicle information and the driver information. The device may include at least one processor and at least one storage storing program codes. When the program codes are executed by the at least one processor, the program codes may direct the at least one processor to perform the method for correlating the vehicle information and the driver information described above. In some embodiments, the present disclosure may also provide a computer readable storage medium. When executed by at least one processor, the method for correlating the vehicle information and the driver information described above may be performed.

In some embodiments, the present disclosure may also provide a method for capturing images by correlated cameras. The method may include obtaining at least two images captured from a monitoring region by at least two capture devices. The at least two capture devices may correspond to different capture angles. The method may also include matching at least one same target (e.g., a vehicle, a driver) in the at least two images by mapping the at least two images into a same coordinate system, and identifying the at least one target based on the at least two images in the same coordinate system. In some embodiments, the present disclosure may also provide a device for capturing images by correlated cameras. The device may include at least one processor and at least one storage storing program codes. When the program codes are executed by the at least one processor, the program codes may direct the at least one processor to perform the method for capturing the images by the correlated cameras described above. In some embodiments, the present disclosure may also provide a computer readable storage medium. When executed by at least one processor, the method for capturing the images by the correlated cameras described above may be performed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A system, comprising:
   at least one storage device including a set of instructions; and
   at least one processor in communication with the at least one storage device, wherein when executing the set of instructions, the at least one processor is configured to cause the system to:
   obtain at least one pair of images from at least one pair of capture devices, wherein
      each of the at least one pair of capture devices includes a first capture device and a second capture device,
      one or more of the at least one pair of images correspond to a respective one of the at least one pair of capture devices, and
      each of the at least one pair of images includes a first image captured by a corresponding first capture device and a second image captured by a corresponding second capture device, a first capture angle of the first capture device being different from a second capture angle of the second capture device; and
   for each of the at least one pair of images,
      determine a first processed image and a second processed image by performing a coordinate transformation on the first image and the second image;
      determine first identification information of at least one first object based on the first processed image; and
      determine second identification information of at least one second object based on the second processed image;

and
  determine at least one information pair by correlating at least a part of the first identification information and at least a part of the second identification information.

2. The system of claim 1, wherein an angle difference between the first capture angle and the second capture angle is 180 degrees.

3. The system of claim 1, wherein to perform the coordinate transformation on the first image and the second image, the at least one processor is configured to cause the system to:
  rotate one of the first image or the second image by 180 degrees.

4. The system of claim 1, wherein to perform the coordinate transformation on the first image and the second image, the at least one processor is configured to cause the system to:
  determine position information of one or more markers in the first image and the second image, respectively; and
  perform the coordinate transformation based on the position information of the one or more markers using a calibration algorithm.

5. The system of claim 1, wherein the at least one first object or the at least one second object includes at least one of a vehicle, a driver of the vehicle, one or more passengers in the vehicle, a pedestrian, or a traffic sign.

6. The system of claim 1, wherein
  the first identification information includes face information associated with a driver of a vehicle, a posture of the driver, face information associated with a passenger in the vehicle, or a count of passengers in the vehicle; and
  the second identification information includes vehicle information associated with a vehicle, the vehicle information comprising license plate information or a color of the vehicle.

7. The system of claim 1, wherein the at least one processor is configured to cause the system further to:
  generate a first matching result by performing similarity matching on a plurality of information pairs corresponding to the at least one pair of images based on the first identification information; or
  generate a second matching result by performing similarity matching on the plurality of information pairs based on the second identification information; and
  determine at least one target information pair based on the first matching result or the second matching result.

8. The system of claim 1, wherein to determine at least one information pair by correlating at least a part of the first identification information and at least a part of the second identification information, the at least one processor is configured to cause the system to:
  determine whether one or more of the at least one first object or the at least one second object have a violation behavior based on the first identification information or the second identification information;
  in response to determining that one or more of the at least one first object or the at least one second object have a violation behavior, determine the at least one information pair by correlating a part of the first identification information associated with objects having the violation behavior and a part of the second identification information associated with the objects having violation behavior.

9. The system of claim 8, wherein the at least one processor is configured to cause the system further to:
  determine secondary identification information by performing secondary identification on the objects having the violation behavior.

10. The system of claim 8, wherein the violation behavior includes at least one of an overloading behavior, a behavior of not wearing a helmet, a behavior of running a red light, a retrograding behavior, or an illegal road occupation.

11. A system, comprising:
  at least one storage device including a set of instructions; and
  at least one processor in communication with the at least one storage device, wherein when executing the set of instructions, the at least one processor is configured to cause the system to:
    obtain at least one primary image captured by at least one primary capture device;
    determine whether a violation target exists based on the at least one primary image;
    in response to determining that the violation target exists, obtain at least one secondary image captured by at least one secondary capture device;
    determine at least one processed primary image and at least one processed secondary image by performing a coordinate transformation on the at least one primary image and the at least one secondary image; and
    identify identification information associated with the violation target based on the at least one processed primary image and the at least one processed secondary image.

12. A method implemented on a computing device including at least one processor, at least one storage medium, and a communication platform connected to a network, the method comprising:
  obtaining at least one pair of images from at least one pair of capture devices, wherein
    each of the at least one pair of capture devices includes a first capture device and a second capture device,
    one or more of the at least one pair of images correspond to a respective one of the at least one pair of capture devices, and
    each of the at least one pair of images includes a first image captured by a corresponding first capture device and a second image captured by a corresponding second capture device, a first capture angle of the first capture device being different from a second capture angle of the second capture device; and
  for each of the at least one pair of images,
    determining a first processed image and a second processed image by performing a coordinate transformation on the first image and the second image;
    determining first identification information of at least one first object based on the first processed image; and
    determining second identification information of at least one second object based on the second processed image;
    and
    determining at least one information pair by correlating at least a part of the first identification information and at least a part of the second identification information.

13. The method of claim 12, wherein an angle difference between the first capture angle and the second capture angle is 180 degrees.

14. The method of claim 12, wherein the performing the coordinate transformation on the first image and the second image includes:
rotating one of the first image or the second image by 180 degrees.

15. The method of claim 12, wherein the at least one first object or the at least one second object includes at least one of a vehicle, a driver of the vehicle, one or more passengers in the vehicle, a pedestrian, or a traffic sign.

16. The method of claim 12, wherein
the first identification information includes face information associated with a driver of a vehicle, a posture of the driver, face information associated with a passenger in the vehicle, or a count of passengers in the vehicle; and
the second identification information includes vehicle information associated with a vehicle, the vehicle information comprising license plate information or a color of the vehicle.

17. The method of claim 12, further comprising:
generating a first matching result by performing similarity matching on a plurality of information pairs corresponding to the at least one pair of images based on the first identification information; or
generating a second matching result by performing similarity matching on the plurality of information pairs based on the second identification information; and
determining at least one target information pair based on the first matching result or the second matching result.

18. The method of claim 12, wherein the determining at least one information pair by correlating at least a part of the first identification information and at least a part of the second identification information includes:
determining whether one or more of the at least one first object or the at least one second object have a violation behavior based on the first identification information or the second identification information;
in response to determining that one or more of the at least one first object or the at least one second object has a violation behavior, determining the at least one information pair by correlating a part of the first identification information associated with objects having the violation behavior and a part of the second identification information associated with the objects having violation behavior.

19. The method of claim 12, wherein the performing the coordinate transformation on the first image and the second image includes:
determining position information of one or more markers in the first image and the second image, respectively; and
performing the coordinate transformation based on the position information of the one or more markers using a calibration algorithm.

20. The method of claim 18, further comprising:
determining secondary identification information by performing secondary identification on the objects having the violation behavior.

* * * * *